United States Patent [19]
Ohtake et al.

[11] Patent Number: 5,663,837
[45] Date of Patent: Sep. 2, 1997

[54] LENS SYSTEM

[75] Inventors: Motoyuki Ohtake, Ohmiya; Koichi Ohshita, Tokyo, both of Japan

[73] Assignee: Nikon Corporation, Tokyo, Japan

[21] Appl. No.: 415,990

[22] Filed: Apr. 4, 1995

[51] Int. Cl.$^6$ .............................. G02B 15/14; G02B 9/00
[52] U.S. Cl. .................................. 359/692; 359/740
[58] Field of Search ........................ 359/692, 740, 359/770

[56] References Cited

U.S. PATENT DOCUMENTS

| | | | |
|---|---|---|---|
| 4,844,599 | 7/1989 | Ito | 359/740 |
| 5,126,884 | 6/1992 | Sato | 359/692 |
| 5,162,947 | 11/1992 | Ito | 359/692 |
| 5,353,163 | 10/1994 | Shibayama et al. | 359/692 |
| 5,541,772 | 7/1996 | Lin | 359/692 |

FOREIGN PATENT DOCUMENTS

| | | |
|---|---|---|
| 3-127012 | 5/1991 | Japan . |
| 3-200912 | 9/1991 | Japan . |
| 3-200913 | 9/1991 | Japan . |

OTHER PUBLICATIONS

"Optics:Second Edition," by Eugene Hecht, Addison–Wesley Publishing Company, Reading, Massechusetts, copyright 1987, pp. 129–132 and 149–153.

*Primary Examiner*—Georgia Y. Epps
*Assistant Examiner*—Evelyn A. Lester
*Attorney, Agent, or Firm*—Shapiro and Shapiro

[57] ABSTRACT

A lens system has a front unit having a positive refractive power and a rear unit having a negative refractive power, in order from the object side, and performs a refractive power varying (zooming) operation by changing an air gap between the two units. The front unit is composed of three lens components of negative, negative, and positive refractive powers.

14 Claims, 24 Drawing Sheets

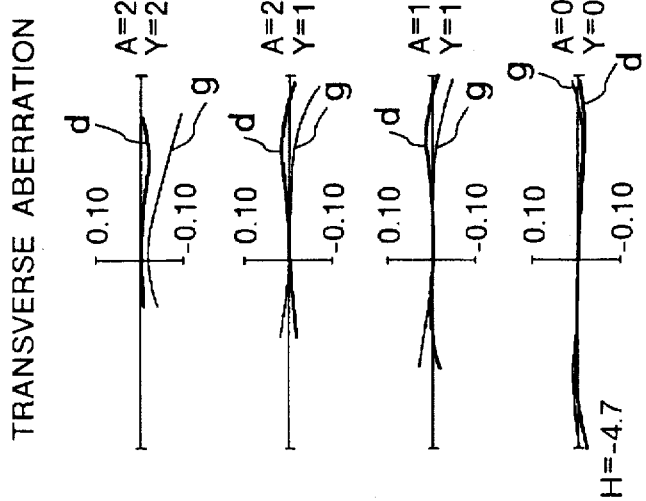
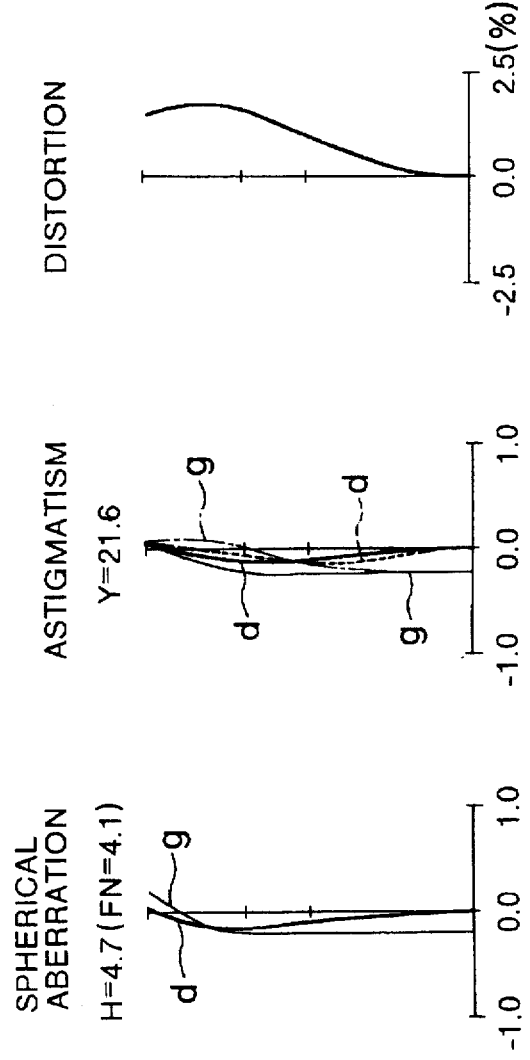

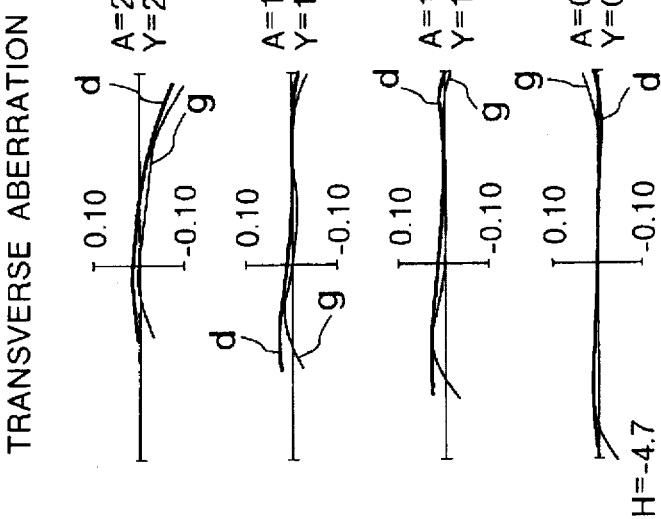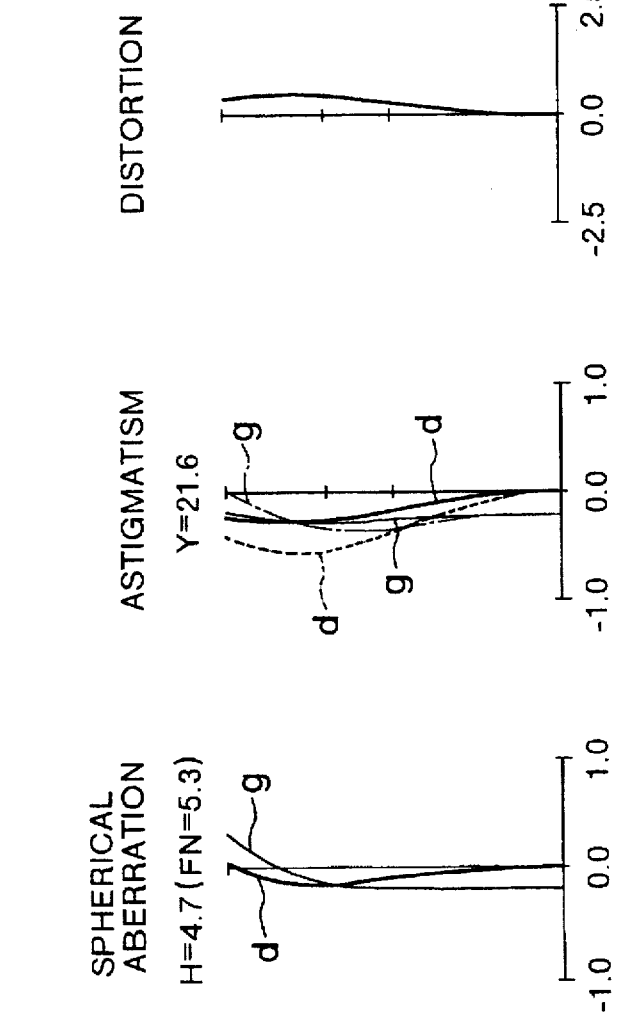

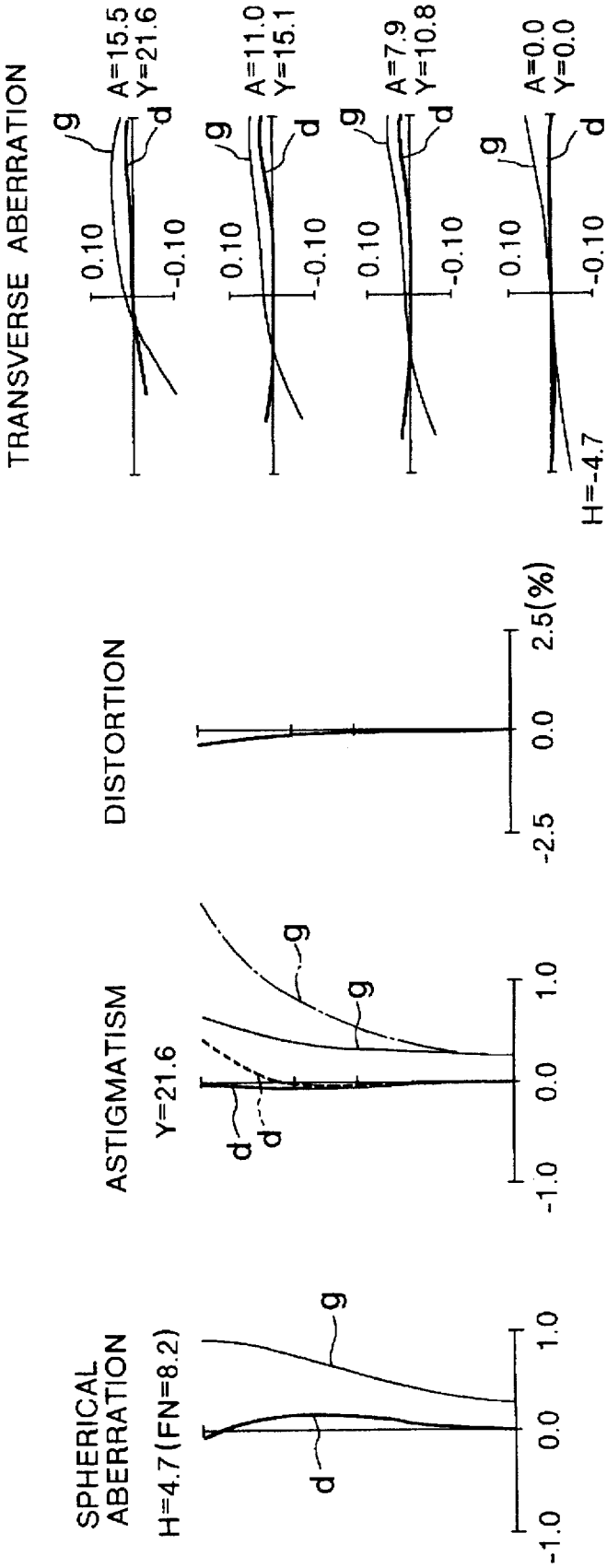

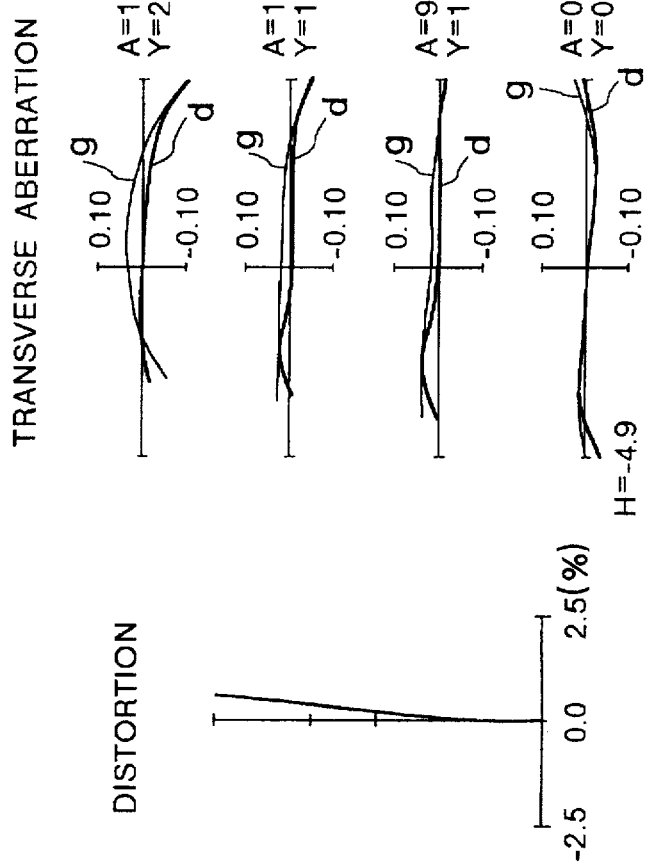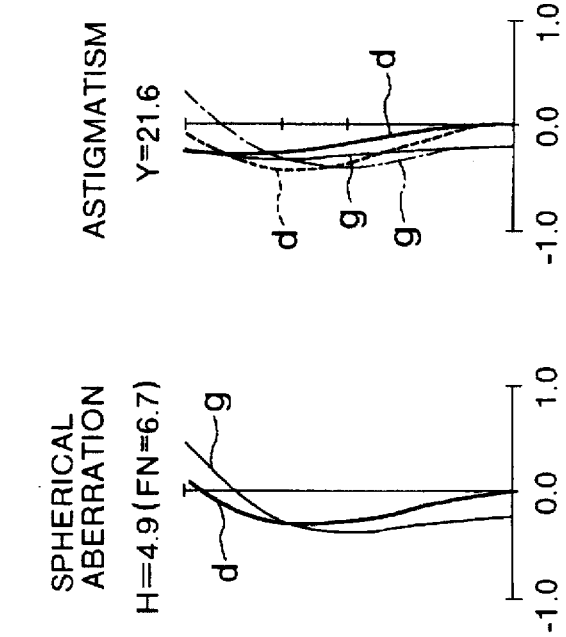

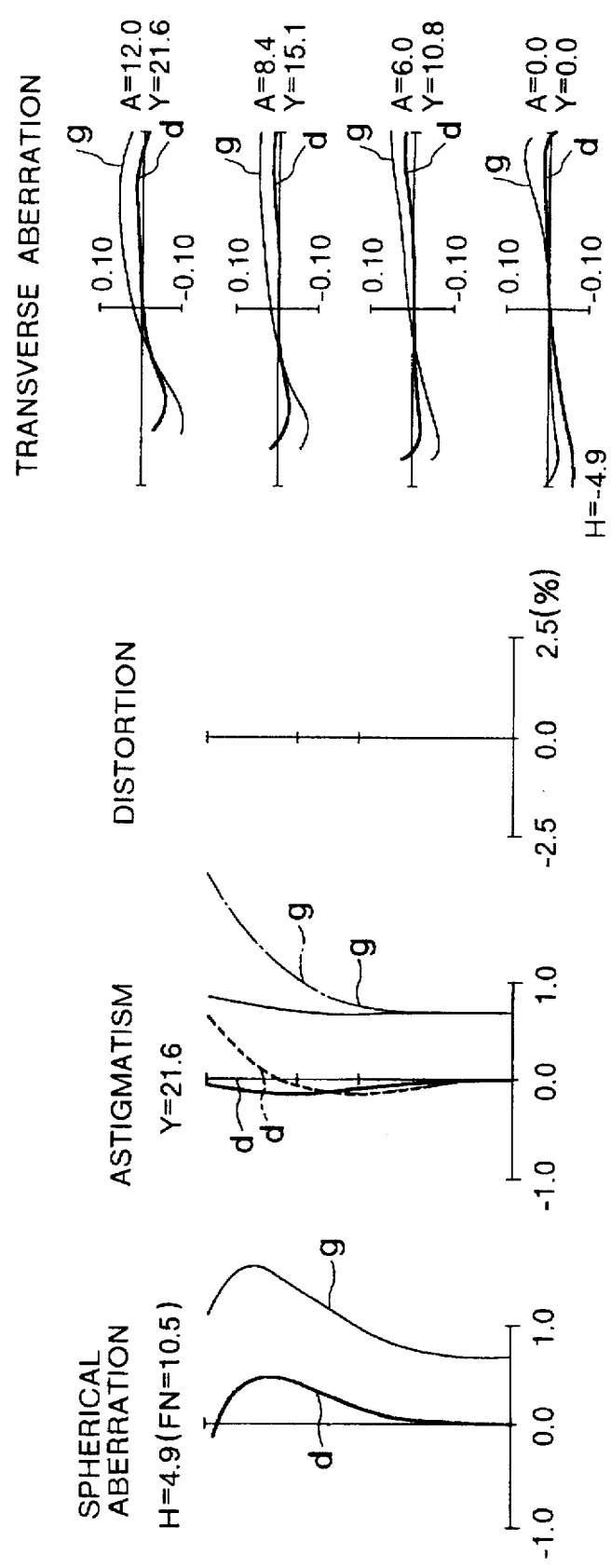

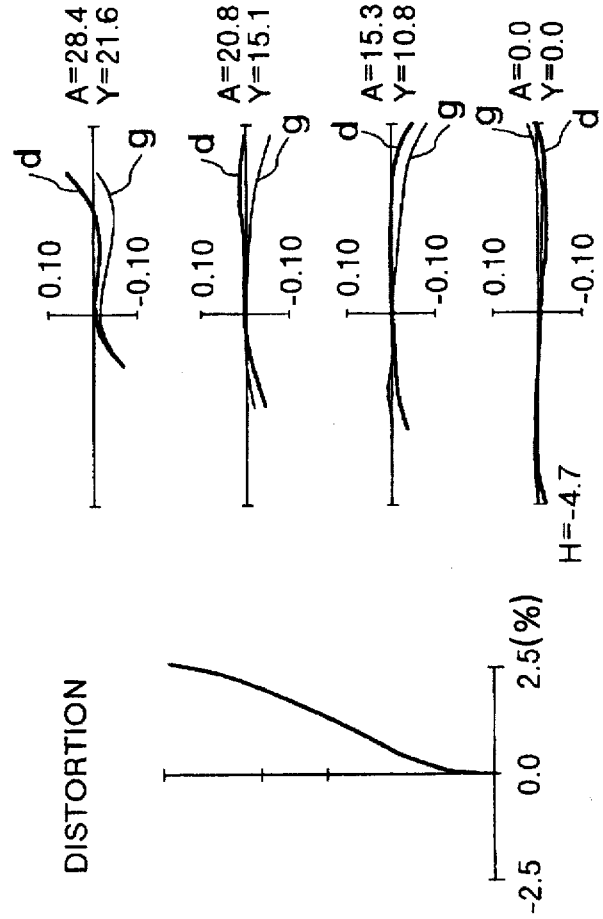
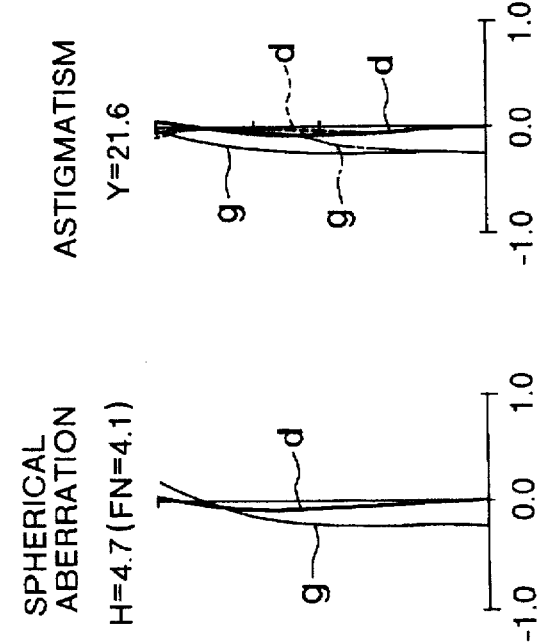
FIG. 22A  FIG. 22B  FIG. 22C  FIG. 22D

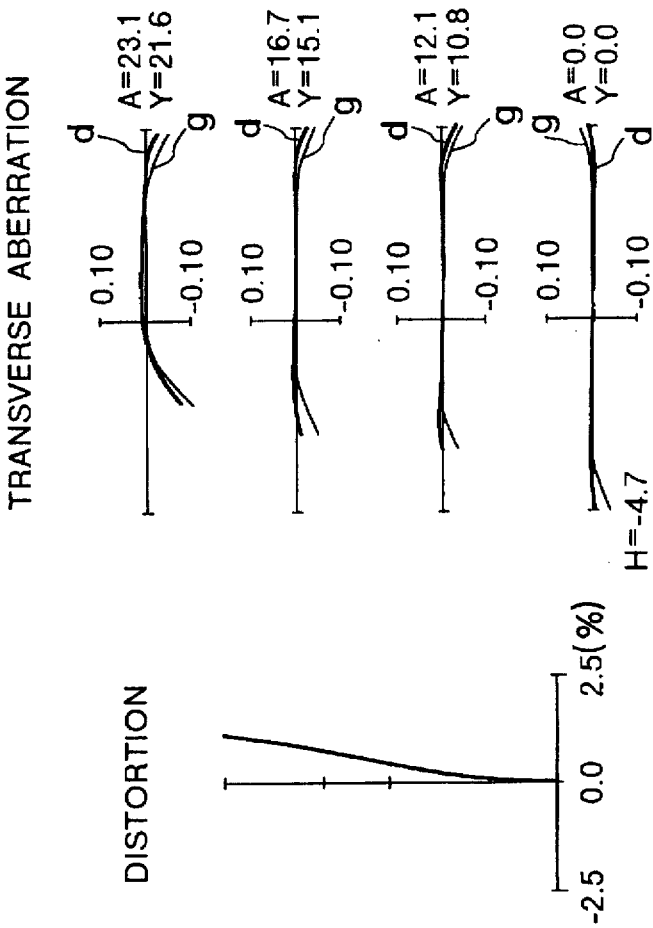

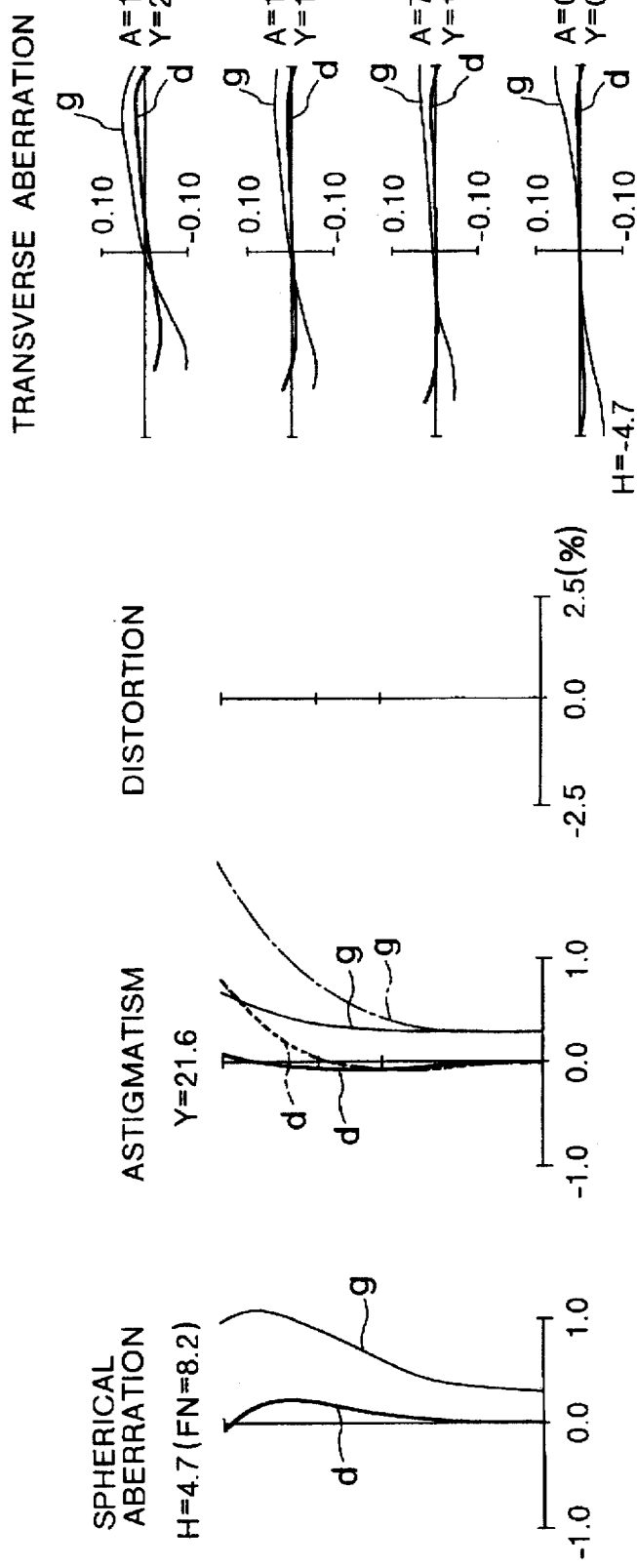

1

LENS SYSTEM

BACKGROUND OF THE INVENTION

1. Field of the Invention

The present invention relates to a lens system for 35 mm lens shutter, and more particularly to a compact and low-cost lens system.

2. Related Background Art

The lens systems for lens shutter cameras are recently decreasing in size while increasing the zoom ratio more and more. The simplest type of lens system, among a variety of zoom types suitable for such lens systems, is a telephoto type lens system composed of two units, a first lens unit $G_1$ having a positive refractive power and a second lens unit $G_2$ having a negative refractive power. This zoom type is suitable for compact zoom lenses with some short back focus, and an example of this type is disclosed in Japanese Patent Application Laid-Open No. 3-200912.

Further, an example of a low-cost lens system is disclosed in Japanese Patent Application Laid-Open No. 3-127012, which discloses a lens system employing aspherical surfaces to reduce the number of constituent lenses. In addition, Japanese Patent Application Laid-Open No. 3-200913 discloses a lens system employing a plastic lens.

In the lens system of Japanese Patent Application Laid-Open No. 3-200912, however, the first lens unit $G_1$ was constructed in an arrangement of positive, negative, and positive refractive powers, in which a component of the negative refractive power had a lens with a strong concave surface facing the object in order to correct a negative spherical aberration and a positive distortion. This lens surface was in turn a convex surface facing the stop, which made corrections of a lower coma difficult, thus causing large aberrations of lower chromatic coma.

In the lens system of Japanese Patent Application Laid-Open No. 3-127012, the first lens unit $G_1$ was constructed in an arrangement of negative and positive refractive powers and correction of aberrations was effected by using many aspherical surfaces. Off-axis aberrations were substantially improved for monochromatic light in the lens system of the Japanese Patent Application Laid-Open No. 3-127012, but correction of transverse chromatic aberration was not sufficient because the number of constituent lenses was small, thus resulting in insufficient achromatism. Further, lens thickness of each unit (a distance between the most object-side surface and the most image-side surface) was not able to be set small because of low degrees of freedom on correction of aberrations, which was not preferable with respect to the size reduction and weight reduction of the camera. In addition, there was a large gap between a negative lens component and a positive lens component constituting the first lens unit, which caused considerable differences of astigmatism depending upon colors.

Further, in the lens system of Japanese Patent Application Laid-Open No. 3-200913, the first lens unit $G_1$ was constructed in an arrangement of negative and positive refractive powers, in which a concave lens was made of a low-dispersive glass material and, therefore, a convex component needed to be used for excessive achromatism, which increased the number of lenses in the first lens unit $G_1$, thus did not reduce the cost.

SUMMARY OF THE INVENTION

It is, therefore, an object of the present invention to provide a lens system with low cost and thin lens thickness.

The lens system of the present invention has the following structure to achieve the above object.

The lens system has, in order from the object side, a first lens unit $G_1$ having a positive refractive power, a second lens unit $G_2$ having a negative refractive power, and a stop located between the first lens unit $G_1$ and the second lens unit $G_2$, wherein a refractive power of the lens system is changed by changing an air gap between the first lens unit $G_1$ and the second lens unit $G_2$;

wherein the first lens unit $G_1$ has, in order from the object side, a first lens component $L_1$ having a negative refractive power, a second lens component $L_2$ having a negative refractive power, and a third lens component $L_3$ having a positive refractive power;

wherein the second lens unit $G_2$ has, in order from the object side, a fourth lens component $L_4$ having a positive refractive power and a fifth lens component $L_5$ having a negative refractive power;

wherein either one of the first lens component $L_1$ and the second lens component $L_2$ is constructed of a plastic lens and the other is constructed of a glass lens; and wherein the following conditions are satisfied:

$$0.29 < |\phi_p \phi_g| / f_a < 0.8 \quad \phi_p < 0, \quad \phi_g < 0 \tag{1}$$

$$0 < (rp_1 - rp_2)/(rp_1 + rp_2) < 0.15 \tag{2}$$

$$0.3 < D_a / f_a < 0.45 \tag{3}$$

where $\phi_p$: a refractive power of the plastic lens in the first lens unit $G_1$;

$\phi_g$: a refractive power of the glass lens with a negative refractive power;

$f_a$: a focal length of the first lens unit $G_1$;

$rp_1$: a paraxial radius of curvature of an object-side lens surface of the plastic lens in the first lens unit $G_1$;

$rp_2$: a paraxial radius of curvature of an image-side lens surface of the plastic lens in the first lens unit $G_1$;

$D_a$: a thickness between a most object-side lens surface and a most image-side lens surface in the first lens unit $G_1$.

In the above lens arrangement according to the present invention, as compared with the arrangement of positive, negative, and positive refractive powers for the first lens unit $G_1$, the position of the principal point of the combination of the first lens component $L_1$ with the second lens component $L_2$ is located away from the stop toward the object, because the first lens component $L_1$ and second lens component $L_2$ have the negative refractive powers. Accordingly, in addition to having an effect of relieving a positive distortion, the refractive power of each lens component can be made weak, the degrees of freedom of aberration correction can be increased, and the lens thickness of the first lens unit $G_1$ can be made thinner, because the distance is increased between the principal point position of the combination and the third lens component $L_3$.

The thickness reduction of the first lens unit $G_1$ permits the gap between the second lens component $L_2$ and the third lens component $L_3$ to be decreased, thereby suppressing the chromatic differences of coma.

Since the plastic lens is used in the first lens unit $G_1$, the costs can be lowered.

Here, it is desired that the first lens component $L_1$, second lens component $L_2$, fourth lens component $L_4$ and fifth lens component $L_5$ each be constructed in a bending configuration that causes as low aberrations for off-axis rays as possible, because they are located away from the stop, and that the third lens component $L_3$ be constructed in a shape that decreases the amount of negative spherical aberration.

The above conditions of the present invention are described in detail in the following.

The condition (1) is a condition for keeping a balance between the size reduction and the axial aberrations and off-axial aberrations, which defines a suitable position for the principal point position of the combination of the first lens component $L_1$ with the second lens component $L_2$.

First, let us consider the case in which the first lens component $L_1$ is a plastic lens.

Here, there are the following two cases that violate the upper limit of condition (1):

(a) when the refractive power $\phi_p$ of the plastic lens becomes strong;

(b) when the refractive power $\phi_g$ of the glass lens becomes strong.

In the case of (a), because the refractive index of the plastic lens greatly depends on temperature, changes in backfocus and curvature of field become large with a change in temperature, thus being not preferable. In the case of (b), the principal point position of the combination of the first lens component $L_1$ with the second lens component $L_2$ becomes closer to the stop, which makes correction of positive distortion difficult.

Conversely, there are the following two cases that fall below the lower limit of condition (1):

(c) when the refractive power $\phi_p$ of the plastic lens becomes weak;

(d) when the refractive power $\phi_g$ of the glass lens becomes weak.

In the case of (c), the air gap between the second lens component $L_2$ and the third lens component $L_3$ needs to be expanded in order to keep the same principal point position of the first lens unit $G_1$, contrary to the desire to reduce the size. In the case of (d), the principal point position of the combination of the first lens component $L_1$ with the second lens component $L_2$ becomes further away from the stop, which can maintain well corrected positive distortion, but which makes it difficult to correct the axial chromatic aberration with respect to g-line (435.8 nm) at the wide-angle end.

Next, let us consider the case in which the second lens component $L_2$ is a plastic lens.

Here, there are the following two cases that fall above the upper limit of condition (1):

(e) when the refractive power $\phi_p$ of the plastic lens becomes strong;

(f) when the refractive power $\phi_g$ of the glass lens becomes strong.

In the case of (e), the refractive index of the plastic lens greatly depends on temperature dependence of refractive index, so that changes in focus position and curvature of field become large with a change in temperature, thus being not preferable. In the case of (f), differences of height become small between axial rays and off-axial rays incident into the first lens component $L_1$, which makes it difficult to sufficiently suppress changes of coma depending upon field angles at the wide-angle end.

Conversely, there are the following two cases that fall below the lower limit of condition (1):

(g) when the refractive power $\phi_p$ of the plastic lens becomes weak;

(h) when the refractive power $\phi_g$ of the glass lens becomes weak.

In the case of (g), it becomes difficult to keep a balance of correction of chromatic aberrations between the axial rays and the off-axial rays. In the case of (h), the correction of axial chromatic aberration with respect to g-line (435.8 nm) at the wide-angle end becomes insufficient, thus being not preferable.

The condition (2) defines a bending shape of the plastic lens in the first lens unit $G_1$, which is a condition for keeping the balance between the off-axial aberrations and the axial aberrations.

Above the upper limit of this condition (2), the object-side lens surface of the plastic lens is a concave surface facing the object and differences become small between entrance heights of axial rays and entrance heights of off-axial rays into the plastic lens, which makes it impossible to correct the changes of coma depending upon field angles, thus being not preferable.

Conversely, below the lower limit, the arrangement is effective with respect to the off-axial rays, but cannot suppress the negative spherical aberration, thus being not preferable.

The condition (3) defines an appropriate value of the lens thickness of the first lens unit, in order to reduce the size of the lens system with good performance.

Above the upper limit of condition (3), the lens thickness $D_a$ of the first lens unit becomes large, which results in an increase of the size of the lens system, thus being not preferable.

Below the lower limit of condition (3), though the lens thickness $D_a$ of the first lens unit is small so as to reduce the size, differences of heights become small between the off-axial rays and the axial rays passing through the respective lens components, which results in failing to suppress the changes of coma depending upon field angles, thus being not preferable.

In the present invention, it is preferable that the following conditions (4) and (5) be further satisfied in addition to the above arrangement.

$$0.04 < D_{23}/f_a < 0.10 \tag{4}$$

$$0.2 < |D_b/f_b| < 0.4 \tag{5}$$

where $D_{23}$: an air gap between the second lens component $L_2$ and the third lens component $L_3$;

$f_a$: the focal length of the first lens unit $G_1$;

$D_b$: a total thickness of lens system between the most object-side surface and the most image-side surface in the second lens unit $G_2$;

$f_b$: a focal length of the second lens unit $G_2$.

Above the upper limit in condition (4), the air gap between the second lens component $L_2$ and the third lens component $L_3$ becomes large, which is contrary to the size reduction. Further, the chromatic coma is large, which is not preferable.

Below the lower limit in condition (4), the lens thickness of the first lens unit $G_1$ is small so as to reduce the size, but the refractive powers of the respective lens components become strong, which makes the correction of coma difficult. Also, the gap tolerance becomes high on production between the second lens component $L_2$ and the third lens component $L_3$, which is against the cost reduction, thus being not preferable.

The condition (5) is for keeping a balance between the size reduction and the correction of off-axial aberrations.

Above the upper limit, the arrangement does not achieve the desired size reduction, thus being not preferable.

Below the lower limit, the arrangement is effective which respect of the size reduction, but the refractive powers of the respective lens components become large, which results in failing to suppress the variations of coma depending upon field angles, thus being not preferable.

Further, it is preferable in the present invention that the following conditions (6) and (7) be satisfied in addition to the above arrangements.

$$|(v_1\phi_1+v_2\phi_2)/(\phi_1+\phi_2)|<35 \quad (6)$$

$$|(N_1\phi_1+N_2\phi_2)/(\phi_1+\phi_2)|>1.60 \quad (7)$$

where $v_1$: an Abbe's number of the first lens component $L_1$;
$\phi_1$: a refractive power of the first lens component $L_1$;
$v_2$: an Abbe's number of the second lens component $L_2$;
$\phi_2$: a refractive power of the second lens component $L_2$;
$N_1$: an index of refraction with respect to d-line, of the first lens component $L_1$;
$N_2$: an index of refraction with respect to d-line, of the second lens component $L_2$.

Above the upper limit in condition (6), the chromatic coma increases, thus being not preferably.

Below the lower limit in condition (7), the Petzval's sum becomes large negatively, which makes correction of positive curvature of field and astigmatism impossible, thus being not preferable.

The above and other objects, features and advantages of the present invention are explained hereinafter and may be better understood by reference to the drawings and the descriptive matter which follows.

BRIEF DESCRIPTION OF THE DRAWINGS

FIGS. 2A to 2D are aberration diagrams at the wide-angle end in Embodiment 1;

FIGS. 3A to 3D are aberration diagrams in a state of an intermediate focal length in Embodiment 1;

FIGS. 4A to 4D are aberration diagrams at the telescopic end in Embodiment 1;

FIGS. 7A to 7D are aberration diagrams in a state of an intermediate focal length in Embodiment 2;

FIGS. 8A to 8D are aberration diagrams at the telescopic end in Embodiment 2;

FIGS. 22A to 22D are aberration diagrams at the wide-angle end in Embodiment 6;

FIGS. 23A to 23D are aberration diagrams in a state of an intermediate focal length in Embodiment 6; and FIGS. 24A to 24D are aberration diagrams at the telescopic end in Embodiment 6.

DETAILED DESCRIPTION OF THE PREFERRED EMBODIMENTS

Figure 1:
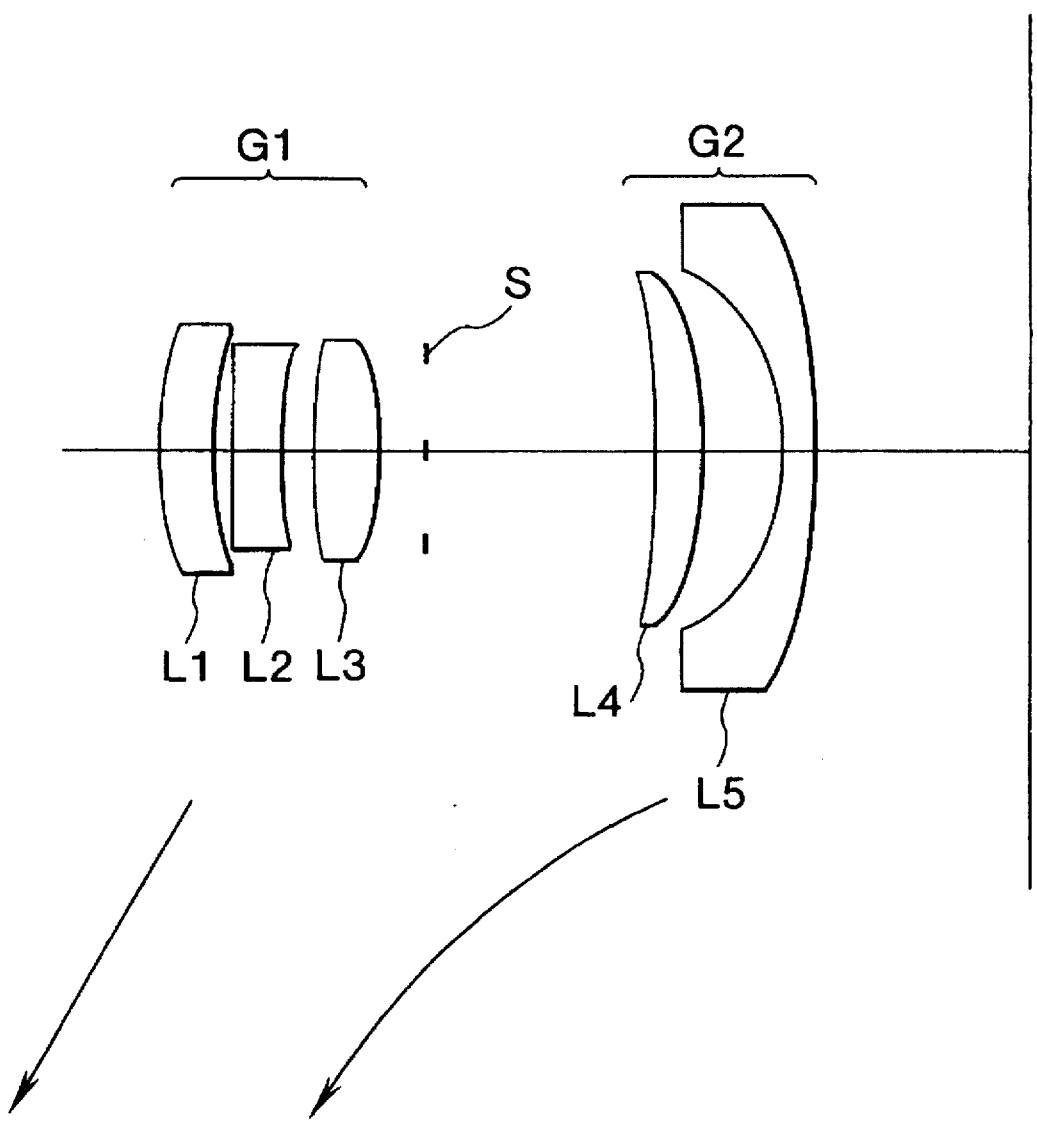
FIG. 1 is a lens layout of Embodiment 1.
Figure 5:
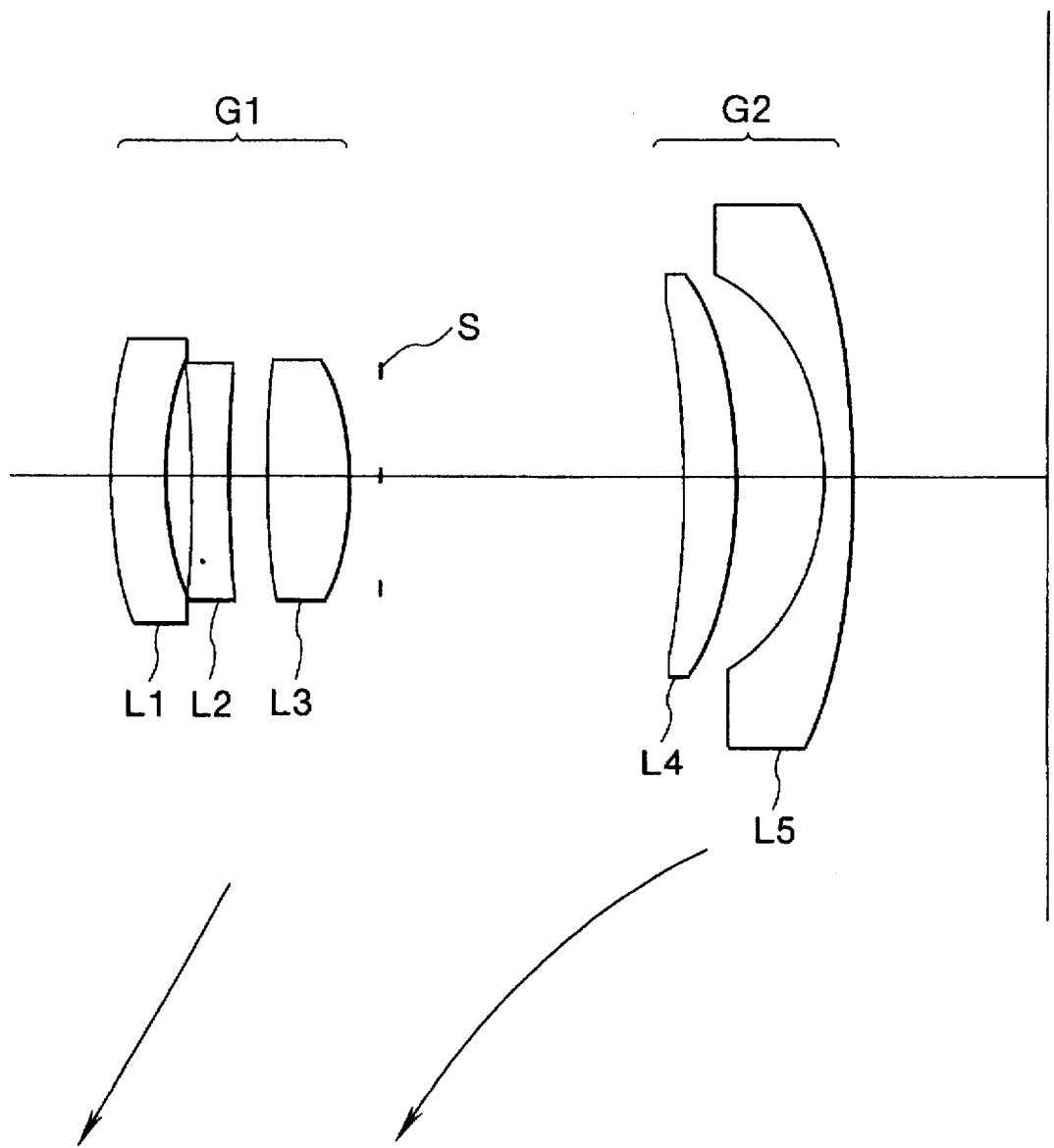
FIG. 5 is a lens layout of Embodiment 2.
Figures 6A, 6B, 6C, 6D:
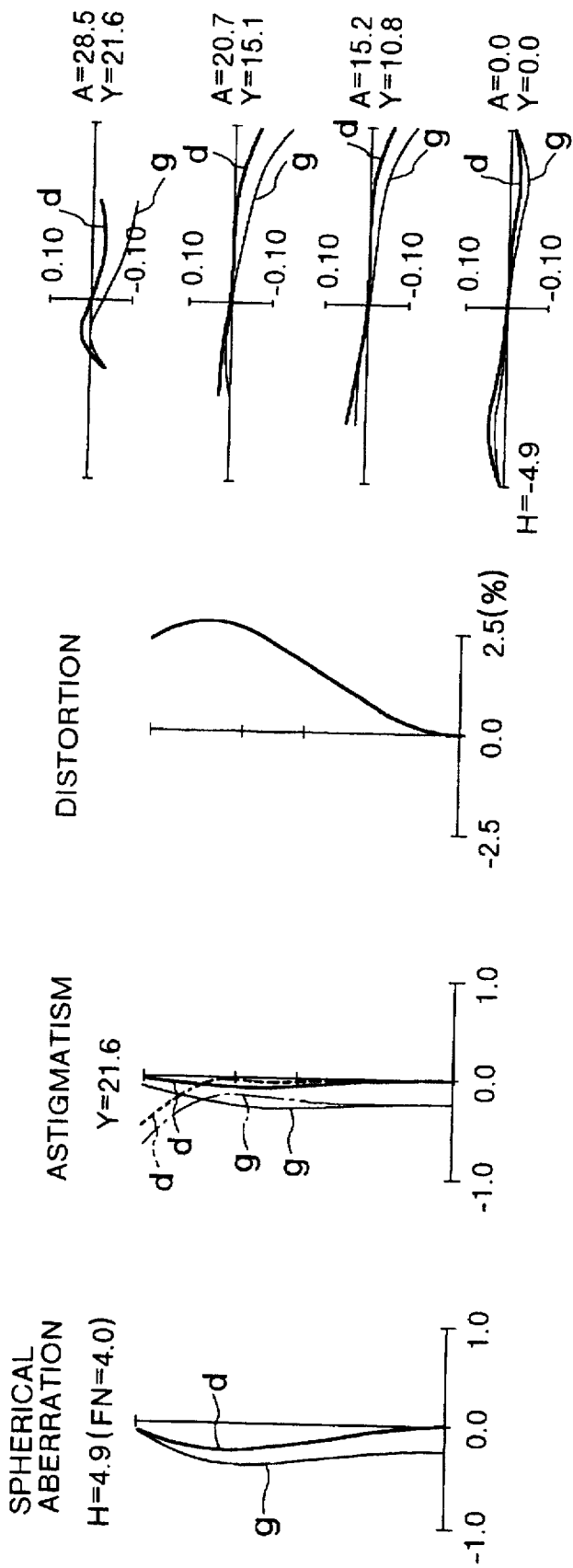
FIGS. 6A to 6D are aberration diagrams at the wide-angle end in Embodiment 2.
Figure 9:
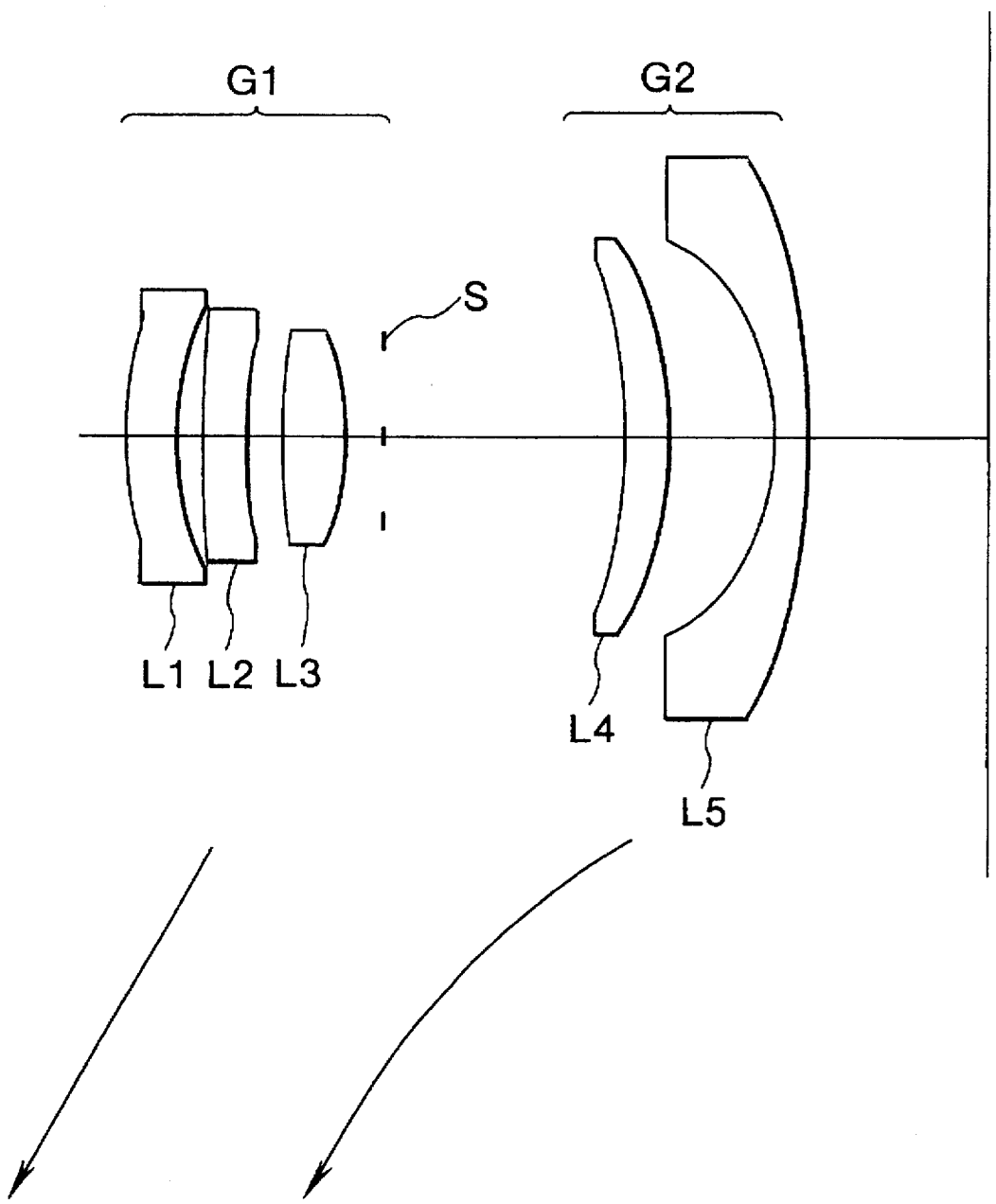
FIG. 9 is a lens layout of Embodiment 3.
Figure 10:
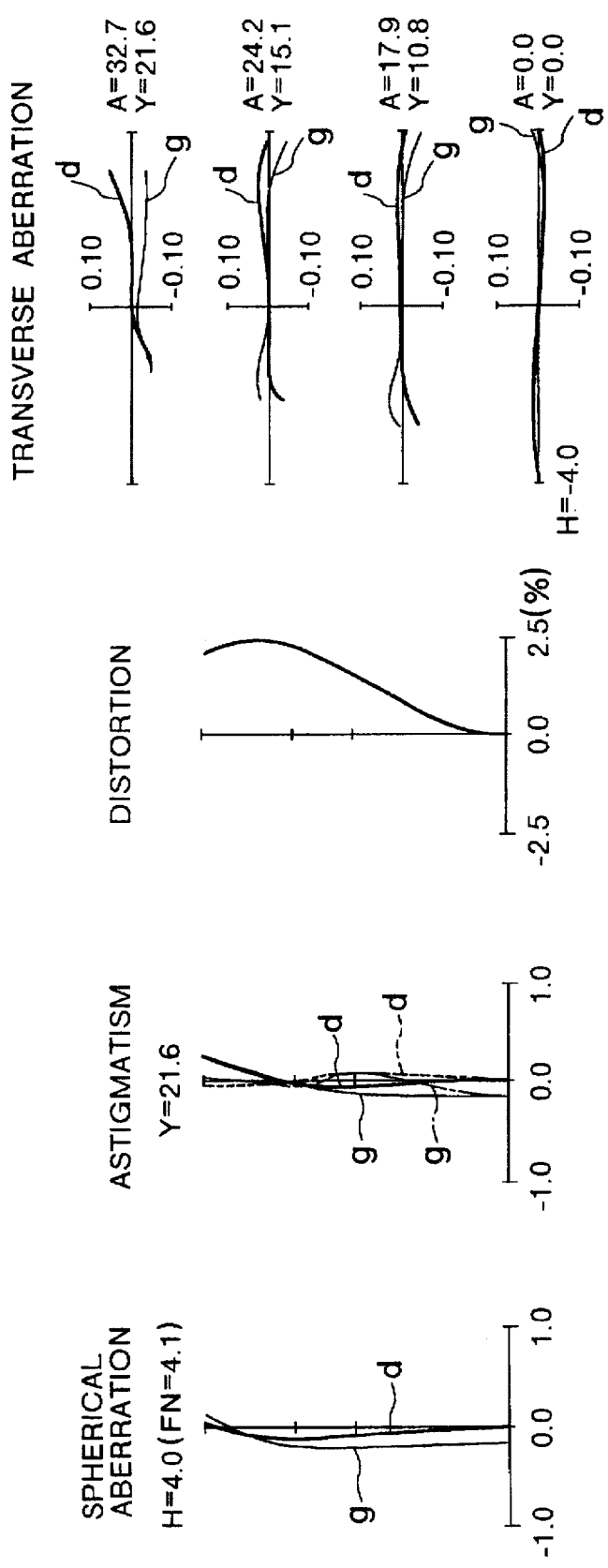
FIG. 10A to 10D are aberration diagrams at the wide-angle end in Embodiment 3.
Figure 11:
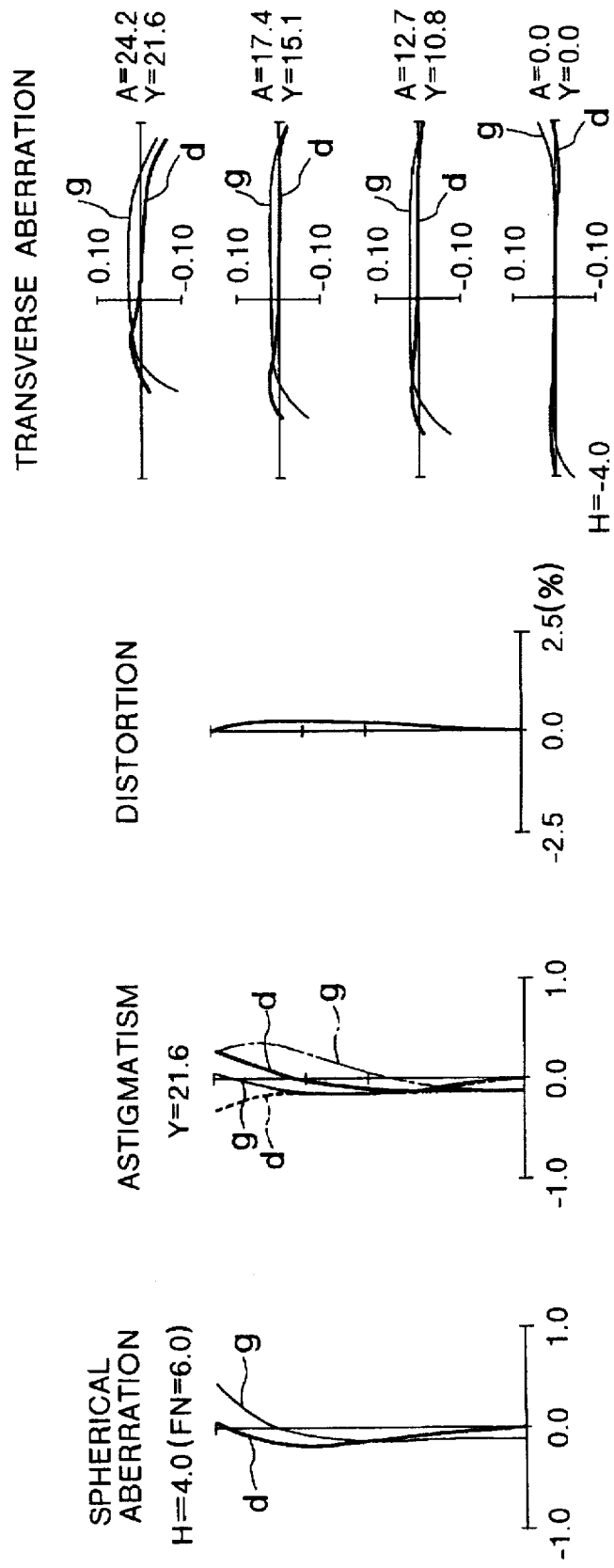
FIGS. 11A to 11D are aberration diagrams in a state of an intermediate focal length in Embodiment 3.
Figure 12:
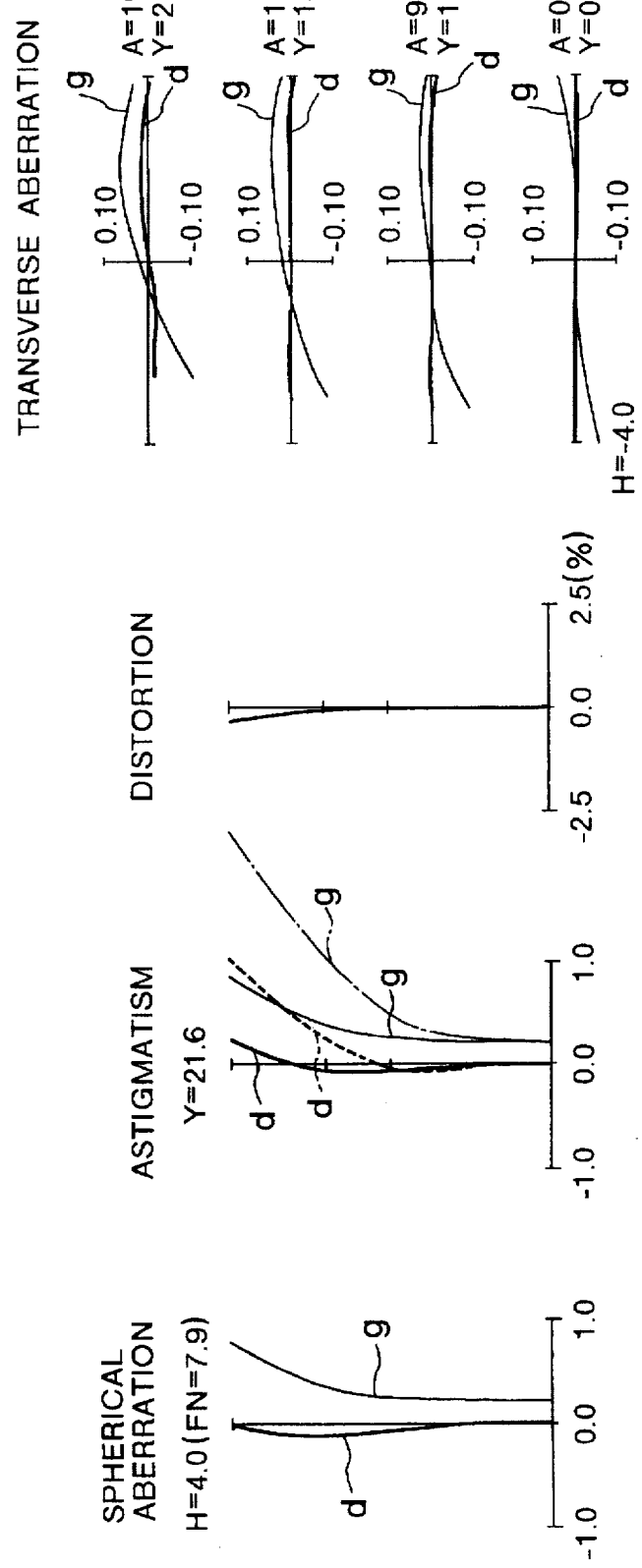
FIGS. 12A to 12D are aberration diagrams at the telescopic end in Embodiment 3.

FIG. 1, FIG. 5, and FIG. 9 are lens layouts of Embodiments 1 to 3, respectively, according to the present invention.

The basic structure of Embodiments 1 to 3 is represented by the lens layout of Embodiment 1 as shown in FIG. 1, in which the lens system has a first lens unit $G_1$ having a positive refractive power and a second lens unit $G_2$ having a negative refractive power in order from the object side, and in which, in a refractive power varying (zooming) operation from the wide-angle end to the telescopic end, the first lens unit $G_1$ and second lens unit $G_2$ move toward the object so as to decrease the air gap between the two lens units. A stop S is placed between the first lens unit $G_1$ and second lens unit $G_2$. The first lens unit $G_1$ is composed of a first lens component $L_1$ that is a negative meniscus lens having a negative refractive power and a convex surface facing the object, a second lens component $L_2$ having a negative refractive power, and a third lens component $L_3$ that is a double-convex lens. The second lens unit $G_2$ is composed of a fourth lens component that is a positive meniscus lens having a positive refractive power and a concave surface facing the object and a fifth lens component $L_5$ that is a negative meniscus lens having a negative refractive power and a concave surface facing the object, as arranged in order from the object side. The above first lens component $L_1$ is constructed as a plastic lens.

In Embodiment 1 and Embodiment 3, the second lens component $L_2$ is a negative meniscus lens having a convex surface facing the object. In Embodiment 2, the second lens component $L_2$ is a double concave lens having a gentler concave surface facing the object.

Figure 13:
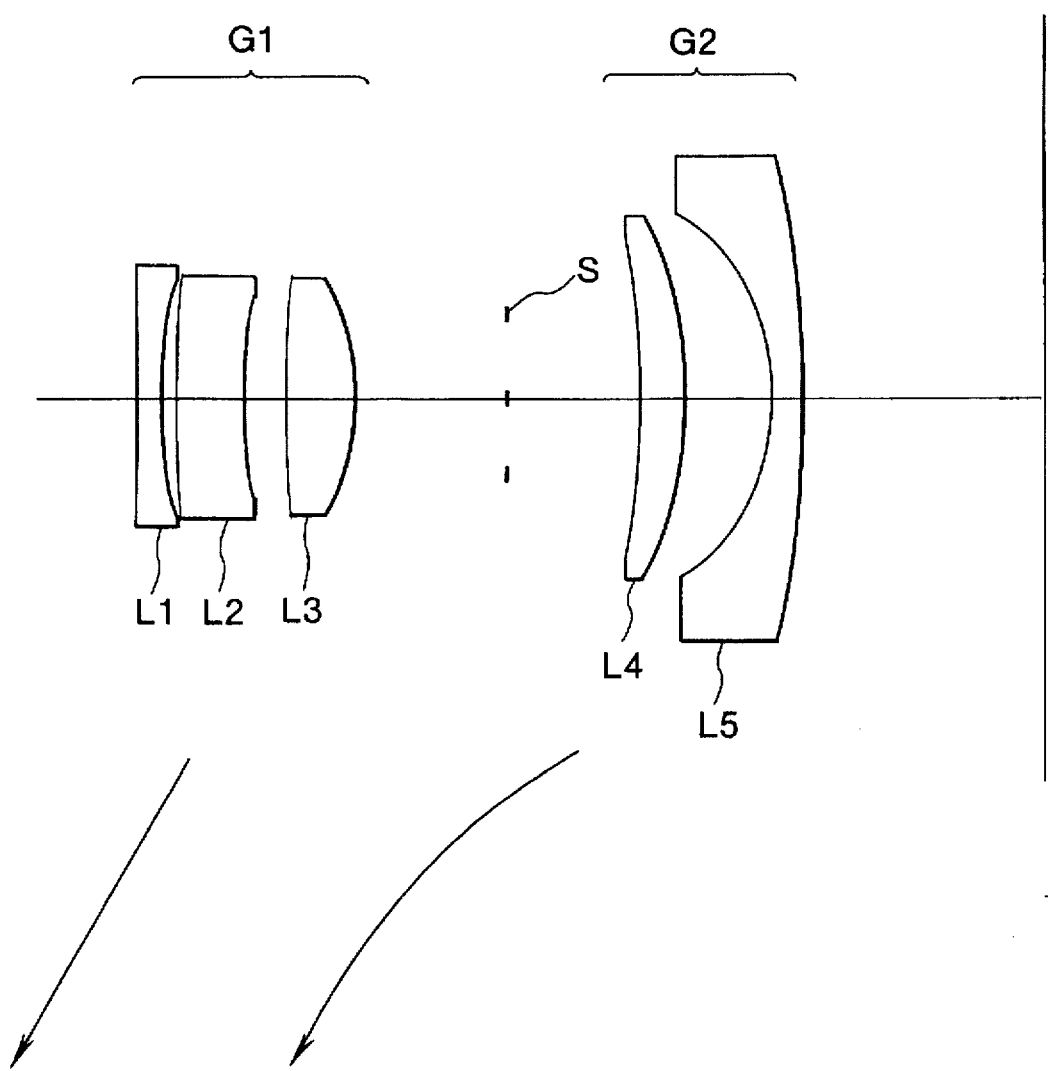
FIG. 13 is a lens layout of Embodiment 4.
Figure 14:
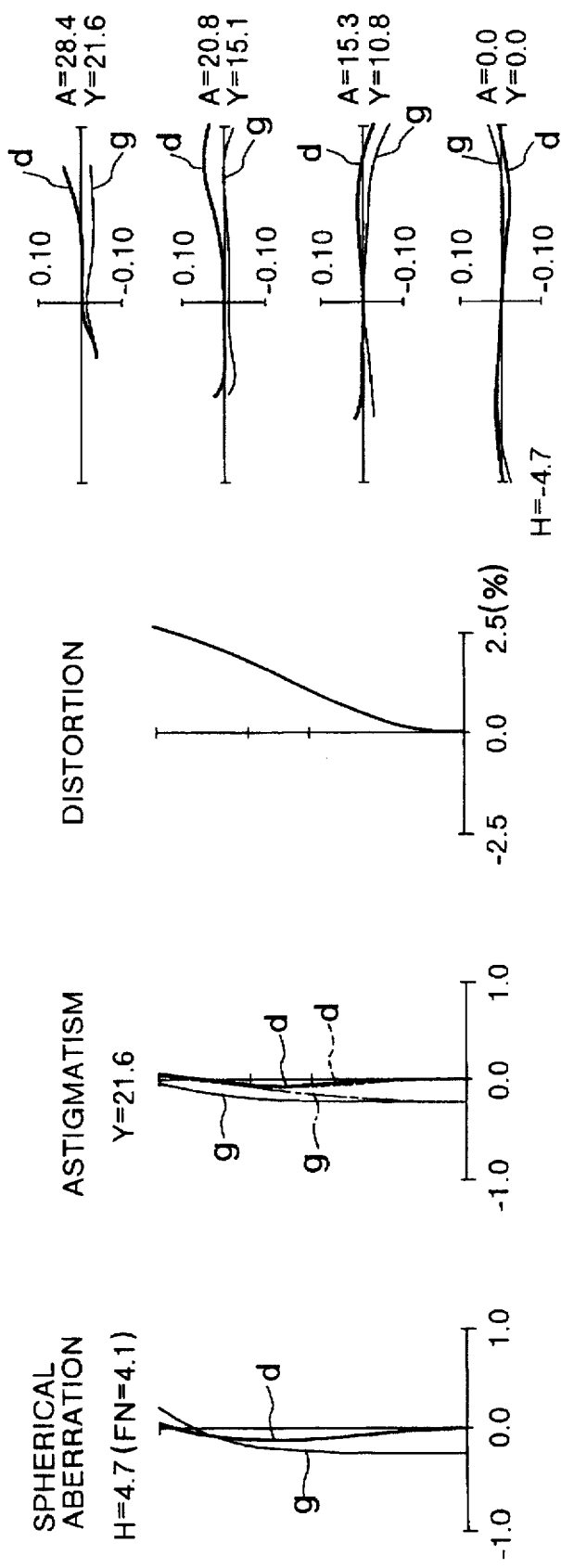
FIGS. 14A to 14D are aberration diagrams at the wide-angle end in Embodiment 4.
Figure 15:
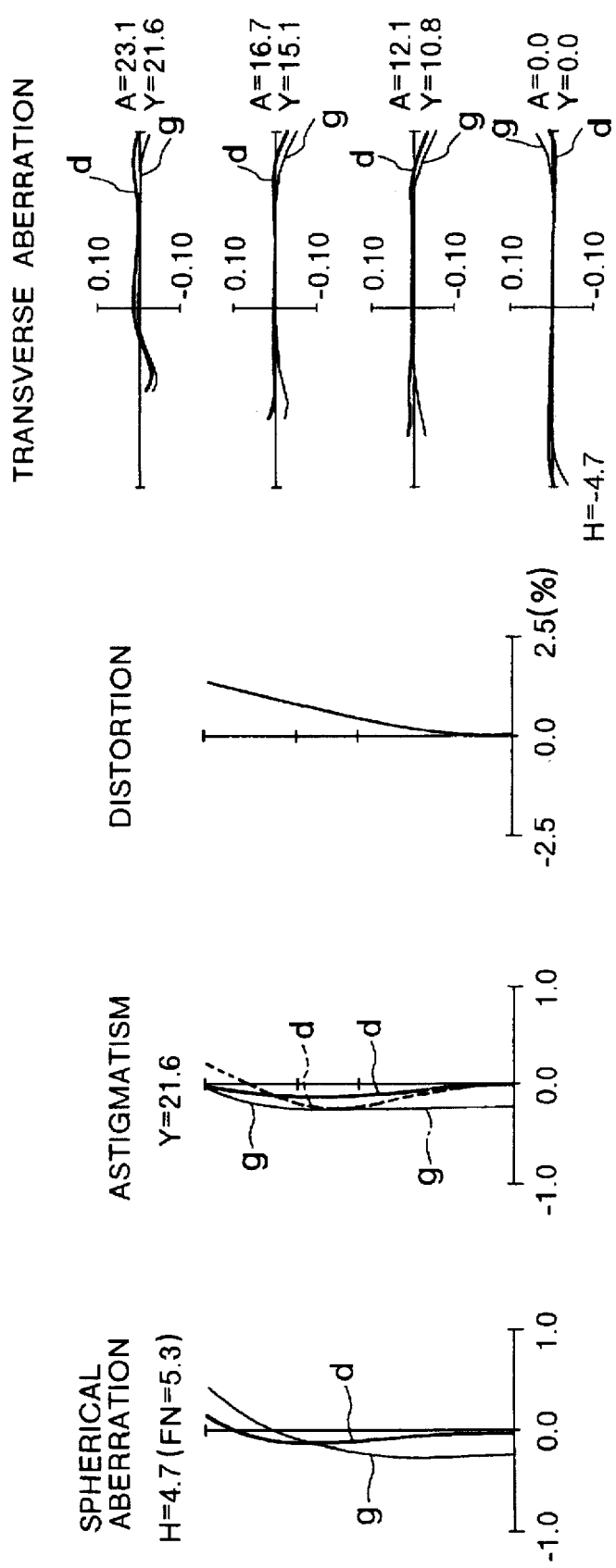
FIGS. 15A to 15D are aberration diagrams in a state of an intermediate focal length in Embodiment 4.
Figure 16:
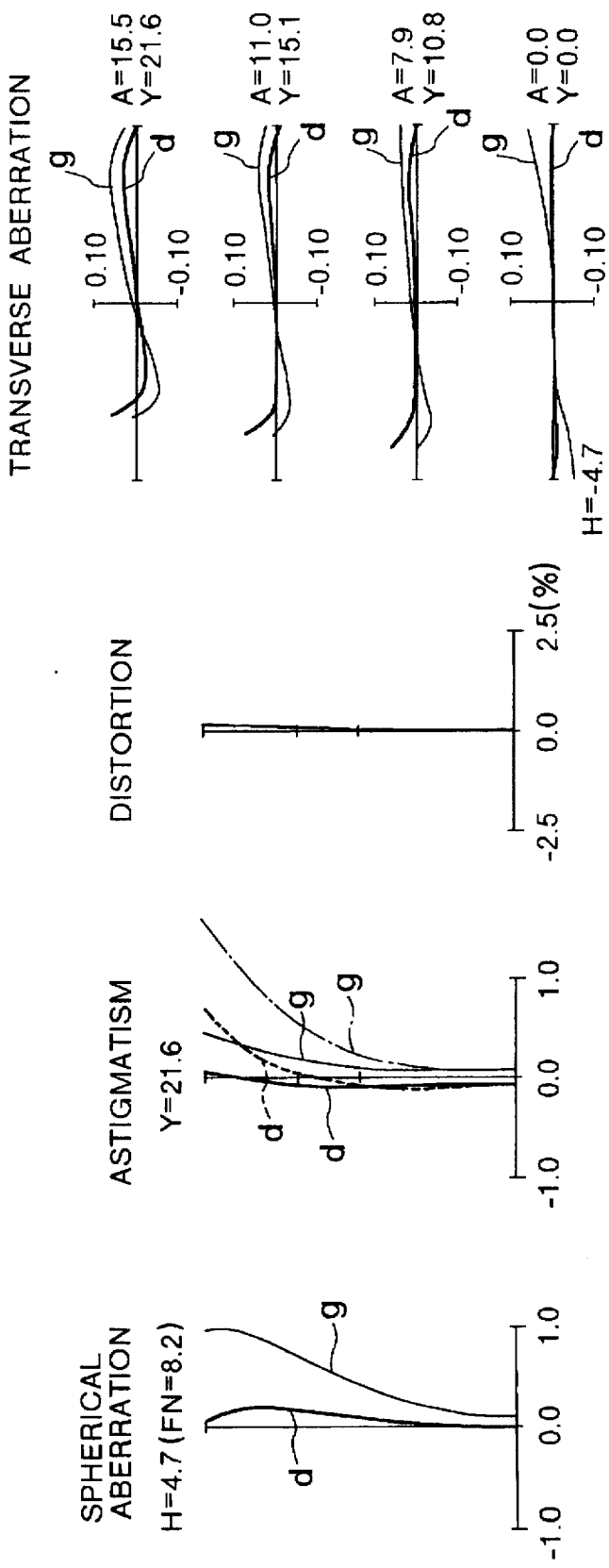
FIGS. 16A to 16D are aberration diagrams at the telescopic end in Embodiment 4.
Figure 17:
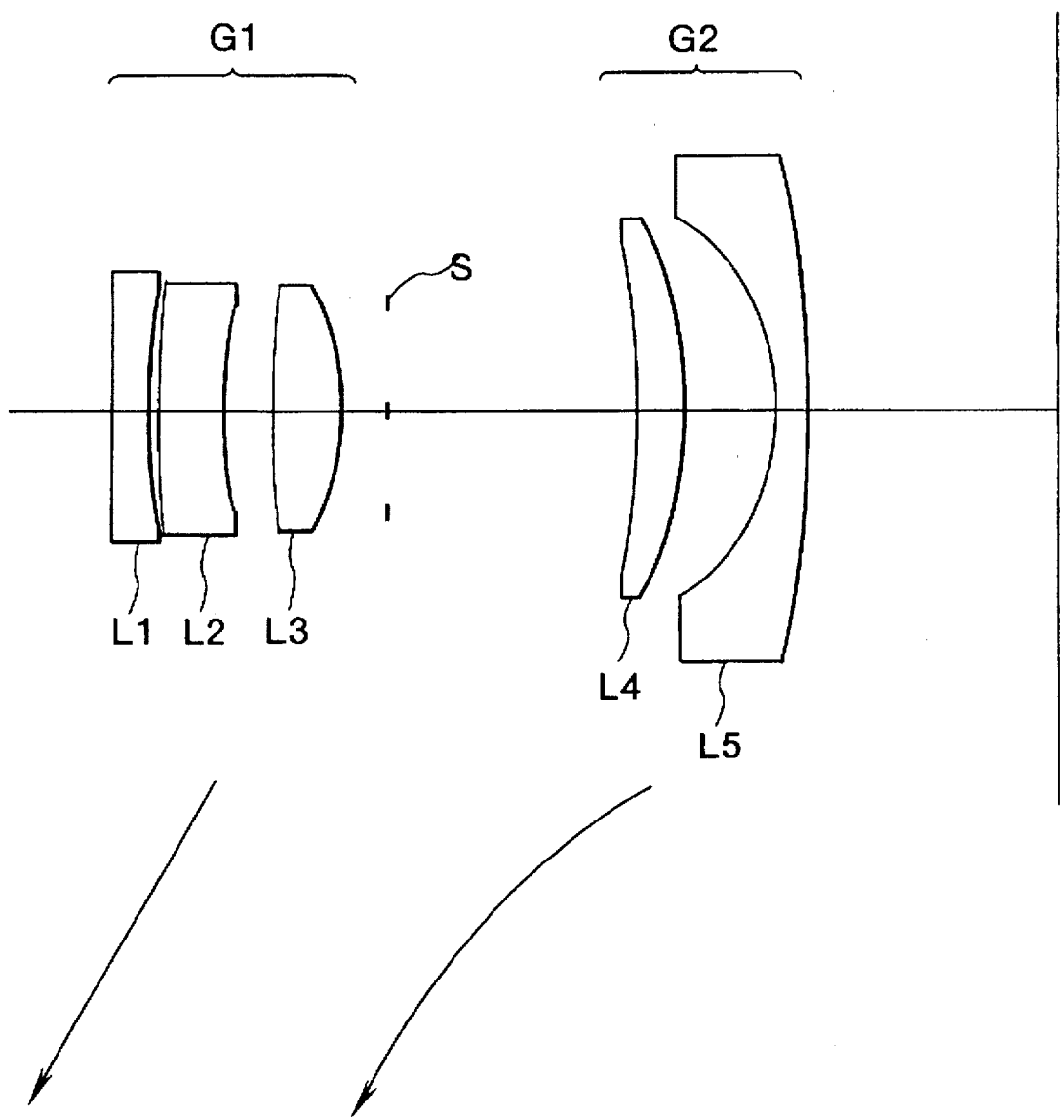
FIG. 17 is a lens layout of Embodiment 5.
Figure 18:
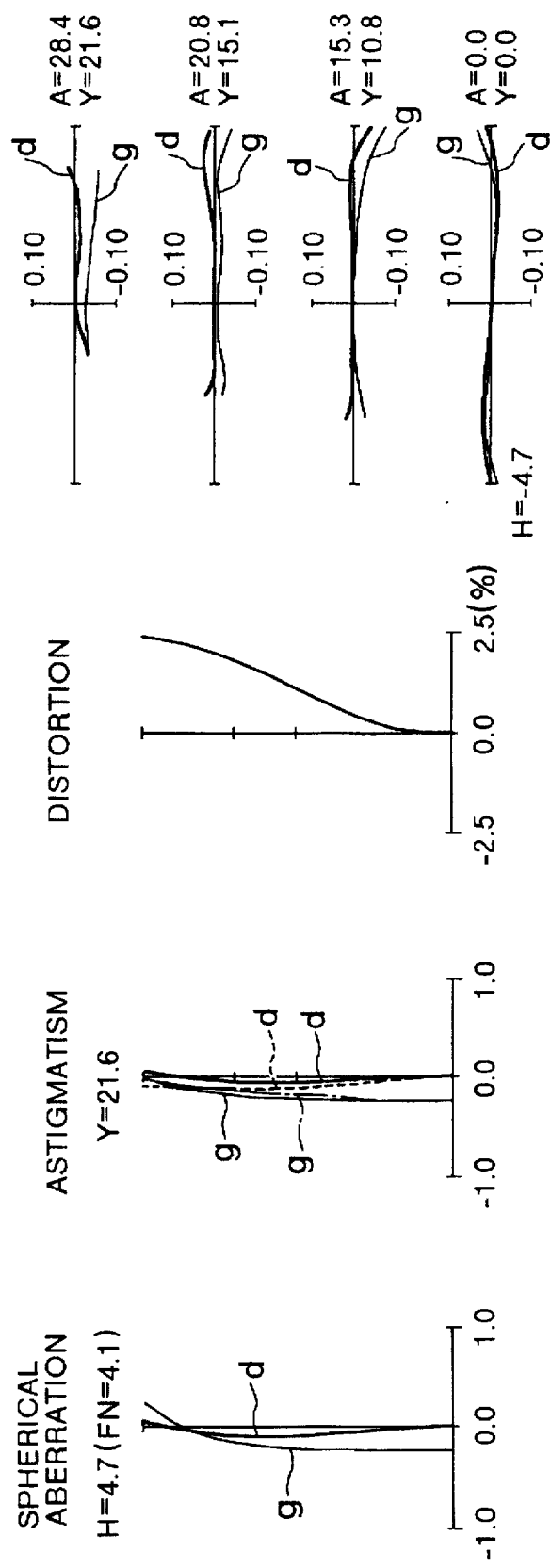
FIGS. 18A to 18D are aberration diagrams at the wide-angle end in Embodiment 5.
Figure 19:
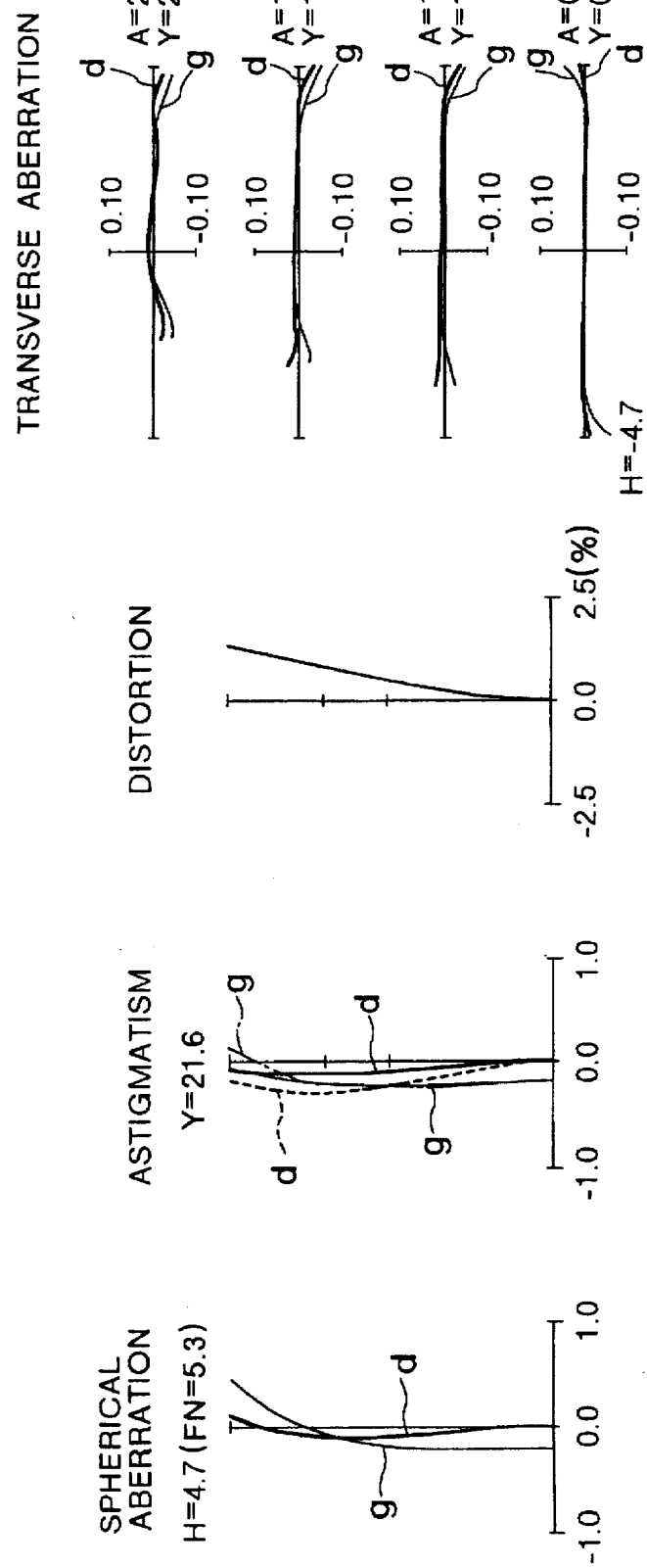
FIGS. 19A to 19D are aberration diagrams in a state of an intermediate focal length in Embodiment 5.
Figure 20:
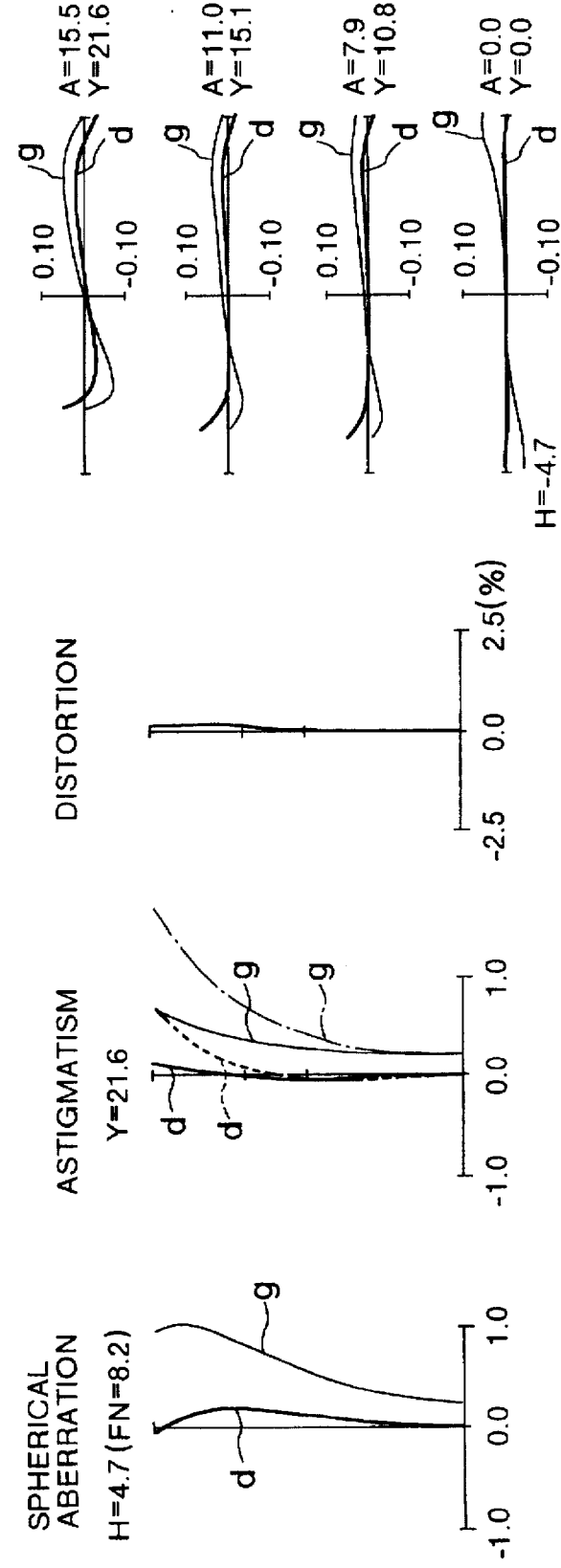
FIGS. 20A to 20D are aberration diagrams at the telescopic end in Embodiment 5.
Figure 21:
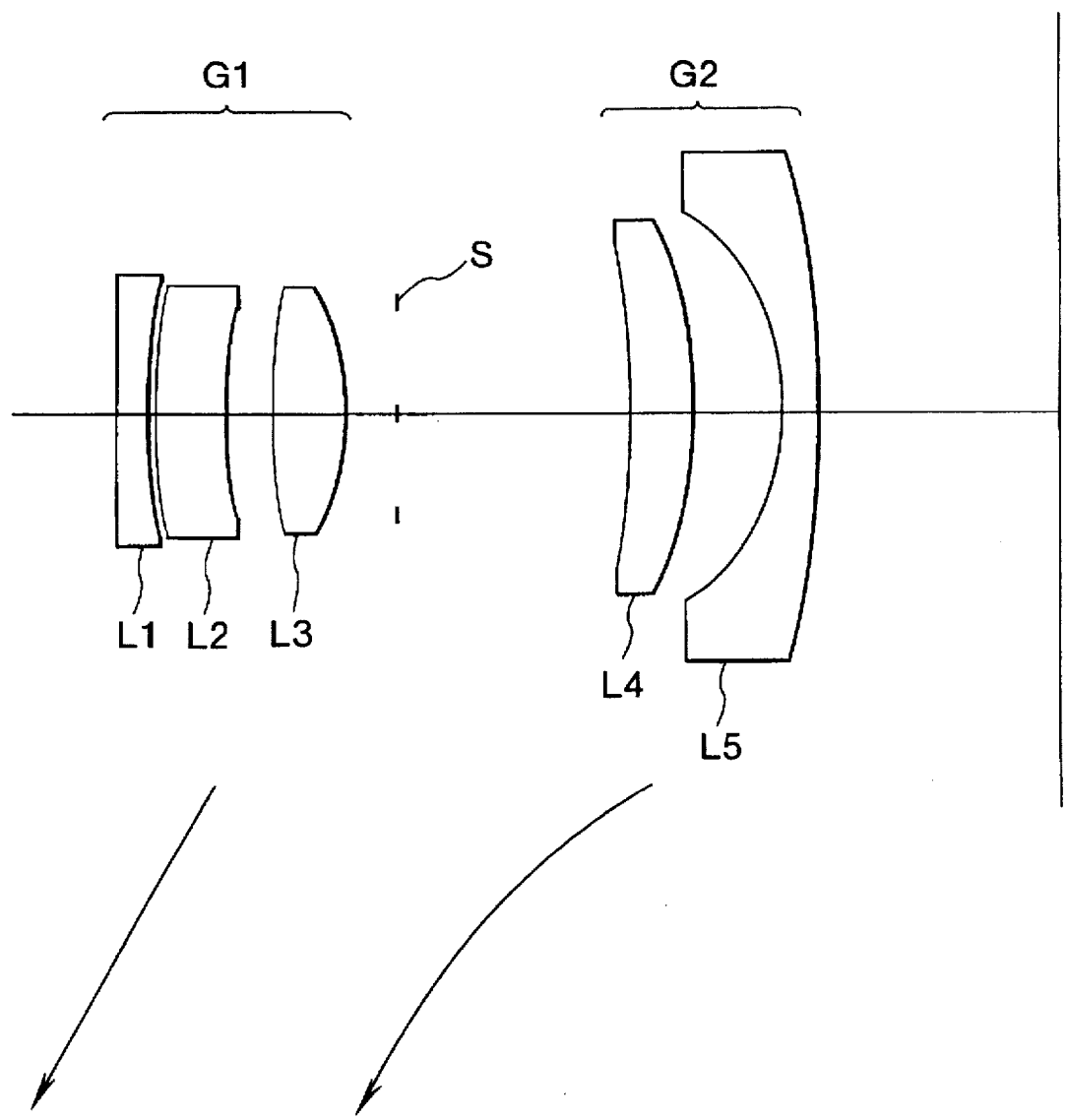
FIG. 21 is a lens layout of Embodiment 6.

FIG. 13, FIG. 17, and FIG. 21 show lens layouts of Embodiments 4 to 6, respectively, according to the present invention.

Since the basic structure of Embodiments 4 to 6 is substantially the same as that of Embodiments 1 to 3 as described above, only differences are described below.

In Embodiments 4 to 6, the second lens component $L_2$ is made of plastic and is a negative meniscus lens having a convex surface facing the object. In Embodiment 4 and Embodiment 6, the first lens component $L_1$ is a negative meniscus lens having a convex surface facing the object. In Embodiment 5, the first lens component $L_1$ is a negative meniscus lens having a gentler concave surface facing the object.

In Embodiments 1 to 6, because the first lens component $L_1$, second lens component $L_2$, fourth lens component $L_4$, and fifth lens component $L_5$ each are located away from the stop S, each component is formed in a bending shape that causes as small aberrations to the off-axial rays as possible. The third lens component $L_3$ is formed in a shape to decrease the amount of negative spherical aberration.

Specifications of each embodiment of the present invention are listed below. In the specifications of each embodiment, numerals at the left end represent orders of lens surfaces from the object side, i.e., surface numbers, r represents radii of curvature of the lens surfaces, d represents lens surface separations, n represents indices of refraction, and ν represents Abbe's numbers with respect to d-line (λ=587.6 nm).

In the specifications, surface numbers of aspherical lens surfaces are accompanied by *. Each of the aspherical surfaces can be expressed by the following formula, where a tangent plane is considered at the vertex of the aspherical surface, the origin is taken at a position where the optical axis passes on this tangent plane, a traveling direction of light is positive, and x is a displacement along the optical axis, of the aspherical surface with respect to the vertex of the spherical surface at a position of height y on the tangent plane.

$$x = cy^2/\{1+(1-\kappa c^2 y^2)^{1/2}\} + c_4 y^4 + c_6 y^6 + c_8 y^8 + c_{10} y^{10}$$

In the formula, c is a curvature of the aspherical surface (an inverse of radius r of curvature) at the vertex of the aspherical surface, κ a quadratic surface parameter, and $C_4$, $C_6$, $C_8$, $C_{10}$ are respective aspherical coefficients.

[Embodiment 1]

f = 39.0–50.0—78.0
$F_{NO}$ = 4.1–5.3–8.2
2ω = 51.2–46.6–31.0°

| | r | d | n | ν | |
|---|---|---|---|---|---|
| 1* | 14.599 | 2.45 | 1.58518 | 30.2 | (plastic) |
| 2* | 12.503 | 1.20 | | | |
| 3 | 158.198 | 2.30 | 1.67270 | 32.2 | |
| 4 | 20.606 | 1.70 | | | |
| 5 | 24.337 | 3.40 | 1.51680 | 64.1 | |
| 6 | −11.353 | 2.20 | | | |
| 7 | 0.000 | 11.65–7.35–1.89 | | | (stop) |
| 8* | −24.650 | 2.30 | 1.58518 | 30.2 | (plastic) |
| 9 | −16.799 | 4.10 | | | |
| 10 | −10.402 | 1.50 | 1.77279 | 49.5 | |
| 11 | −31.885 | | | | |

| | 1st surface | 2nd surface | 8th surface |
|---|---|---|---|
| κ | −0.9568 | 1.0000 | 0.0000 |
| $C_4$ | −0.1041 × 10⁻³ | −0.8133 × 10⁻⁴ | 0.4625 × 10⁻⁴ |
| $C_6$ | −0.2961 × 10⁻⁵ | −0.3151 × 10⁻⁵ | 0.1689 × 10⁻⁶ |
| $C_8$ | −0.4347 × 10⁻⁷ | −0.4498 × 10⁻⁷ | 0.4595 × 10⁻⁸ |
| $C_{10}$ | 0.4559 × 10⁻⁹ | 0.1079 × 10⁻⁸ | −0.1134 × 10⁻¹⁰ |

Values corresponding to the conditions in the present embodiment are as follows:

$|\phi_p + \phi_g|\cdot f_a = 0.661$ (1)

$(rp_1 - rp_2)/(rp_1 + rp_2) = 0.074$ (2)

$D_a/f_a = 0.406$ (3)

$D_{23}/f_a = 0.063$ (4)

$ID_b/f_b = 0.282$ (5)

$|(\nu_1\phi_1 + \nu_2\phi_2)/(\phi_1 + \phi_2)| = 31.0$ (6)

$|(N_1\phi_1 + N_2\phi_2)/(\phi_1 + \phi_2)| = 1.662$ (7)

[Embodiment 2]

f = 39.0–65.0—102.0
$F_{NO}$ = 4.0–6.7–10.5
2ω = 57.0–36.6–24.0°

| | r | d | n | ν | |
|---|---|---|---|---|---|
| 1* | 16.802 | 2.50 | 1.58518 | 30.2 | (plastic) |
| 2* | 14.513 | 1.20 | | | |
| 3 | −114.534 | 1.80 | 1.74000 | 28.2 | |
| 4 | 60.723 | 1.80 | | | |
| 5 | 43.568 | 4.00 | 1.51680 | 64.1 | |
| 6 | −11.897 | 1.40 | | | |
| 7 | 0.000 | 14.6–6.48–2.056 | | | (stop) |
| 8* | −28.587 | 2.50 | 1.58518 | 30.2 | (plastic) |
| 9 | −18.823 | 4.20 | | | |
| 10 | −10.859 | 1.50 | 1.77279 | 49.5 | |
| 11 | −35.639 | | | | |

| | 1st surface | 2nd surface | 8th surface |
|---|---|---|---|
| κ | −3.7580 | 0.4319 | −7.4250 |
| $C_4$ | 0.0000 | 0.0000 | 0.0000 |
| $C_6$ | −0.3302 × 10⁻⁵ | −0.1997 × 10⁻⁵ | 0.6561 × 10⁻⁶ |
| $C_8$ | −0.2866 × 10⁻⁸ | −0.1194 × 10⁻⁷ | −0.1741 × 10⁻⁸ |
| $C_{10}$ | −0.1307 × 10⁻⁹ | 0.8592 × 10⁻¹⁰ | 0.1857 × 10⁻¹⁰ |

Values corresponding to the conditions in the present embodiment are as follows:

$|\phi_p + \phi_g|\cdot f_a = 0.404$ (1)

$(rp_1 - rp_2)/(rp_1 + rp_2) = 0.073$ (2)

$D_a/f_a = 0.396$ (3)

$D_{23}/f_a = 0.063$ (4)

$ID_b/f_b = 0.293$ (5)

$|(\nu_1\phi_1 + \nu_2\phi_2)/(\phi_1 + \phi_2)| = 28.5$ (6)

$|(N_1\phi_1 + N_2\phi_2)/(\phi_1 + \phi_2)| = 1.717$ (7)

[Embodiment 3]

f = 39.0–50.0—78.0
$F_{NO}$ = 4.1–5.3–8.2
2ω = 51.2–46.6–31.0°

| | r | d | n | ν | |
|---|---|---|---|---|---|
| 1* | 13.026 | 2.17 | 1.58518 | 30.2 | (plastic) |
| 2* | 10.335 | 1.20 | | | |
| 3 | 74.845 | 1.77 | 1.68893 | 31.1 | |
| 4 | 20.100 | 1.65 | | | |
| 5 | 23.407 | 2.87 | 1.51680 | 64.1 | |
| 6 | −10.200 | 1.76 | | | |
| 7 | 0.000 | 10.39–4.80–1.87 | | | (stop) |
| 8* | −22.201 | 2.02 | 1.58518 | 30.2 | (plastic) |
| 9 | −16.557 | 4.65 | | | |
| 10 | −9.783 | 1.31 | 1.77279 | 49.5 | |
| 11 | −29.750 | | | | |

| | 1st surface | 2nd surface | 8th surface |
|---|---|---|---|
| κ | −3.7580 | 0.4319 | −7.4250 |
| $C_4$ | −0.9583 | 1.0000 | 0.0000 |
| $C_4$ | −0.2181 × 10⁻³ | −0.2286 × 10⁻³ | 0.5175 × 10⁻⁴ |
| $C_6$ | −0.7734 × 10⁻⁵ | −0.8288 × 10⁻⁵ | 0.3974 × 10⁻⁶ |
| $C_8$ | 0.3222 × 10⁻⁷ | 0.9204 × 10⁻⁷ | 0.3259 × 10⁻⁸ |
| $C_{10}$ | −0.1341 × 10⁻⁹ | 0.3038 × 10⁻⁹ | −0.3015 × 10⁻¹¹ |

Values corresponding to the conditions in the present embodiment are as follows:

$|\phi_p + \phi_g|\cdot f_a = 0.393$ (1)

$(rp_1-rp_2)/(rp_1+rp_2)=0.115$     (2)

$D_a/f_a=0.403$     (3)

$D_{23}/f_a=0.069$     (4)

$|D_b/f_b|=0.326$     (5)

$|(v_1\phi_1+v_2\phi_2)/(\phi_1+\phi_2)|=30.9$     (6)

$|(N_1\phi_1+N_2\phi_2)/(\phi_1+\phi_2)|=1.662$     (7)

[Embodiment 4]

f = 39.0–50.0—78.0
$F_{NO}$ = 4.1–5.3–8.2
2ω = 57.8–46.2–31.0°

| | r | d | n | v | |
|---|---|---|---|---|---|
| 1 | 400.000 | 1.50 | 1.67270 | 32.2 | |
| 2 | 31.549 | 0.30 | | | |
| 3* | 19.640 | 3.30 | 1.58518 | 30.2 | (plastic) |
| 4* | 17.037 | 2.30 | | | |
| 5 | 59.105 | 3.40 | 1.51860 | 70.0 | |
| 6 | −10.847 | 2.20 | | | |
| 7 | 0.000 | 11.77–7.48–2.01 | | | (stop) |
| 8* | −39.761 | 2.30 | 1.58518 | 30.2 | (plastic) |
| 9 | −20.501 | 4.25 | | | |
| 10 | −11.178 | 1.50 | 1.71700 | 48.0 | |
| 11 | −62.820 | | | | |

| | 3rd surface | 4th surface | 8th surface |
|---|---|---|---|
| κ | 0.4034 | 0.2157 | 0.2991 |
| $C_4$ | $-0.3019 \times 10^{-3}$ | $-0.1532 \times 10^{-3}$ | $0.3928 \times 10^{-4}$ |
| $C_6$ | $-0.4545 \times 10^{-5}$ | $-0.3449 \times 10^{-5}$ | $0.3371 \times 10^{-6}$ |
| $C_8$ | $-0.4977 \times 10^{-9}$ | $-0.4114 \times 10^{-7}$ | $-0.2399 \times 10^{-8}$ |
| $C_{10}$ | $-0.1860 \times 10^{-9}$ | $0.3417 \times 10^{-10}$ | $0.2805 \times 10^{-10}$ |

Values corresponding to the conditions in the present embodiment are as follows:

$|\phi_p+\phi_g|\cdot f_a=0.467$     (1)

$(rp_1-rp_2)/(rp_1+rp_2)=0.071$     (2)

$D_a/f_a=0.397$     (3)

$D_{23}/f_a=0.085$     (4)

$|D_b/f_b|=0.288$     (5)

$|(v_1\phi_1+v_2\phi_2)/(\phi_1+\phi_2)|=31.9$     (6)

$|(N_1\phi_1+N_2\phi_2)/(\phi_1+\phi_2)|=1.663$     (7)

[Embodiment 5]

f = 39.0–50.0—78.0
$F_{NO}$ = 4.1–5.3–8.2
2ω = 56.8–46.2–31.0°

| | r | d | n | v | |
|---|---|---|---|---|---|
| 1 | −330.236 | 1.50 | 1.61750 | 30.8 | |
| 2 | 44.061 | 0.30 | | | |
| 3* | 20.849 | 3.20 | 1.58518 | 30.2 | (plastic) |
| 4* | 17.251 | 2.35 | | | |
| 5 | 71.943 | 3.20 | 1.5186 | 70.0 | |
| 6 | −10.925 | 2.20 | | | |
| 7 | 0.000 | 11.6–7.34–1.88 | | | (stop) |
| 8* | −38.225 | 2.30 | 1.58518 | 30.2 | (plastic) |
| 9 | −20.408 | 4.25 | | | |
| 10 | −11.063 | 1.50 | 1.71700 | 48.0 | |
| 11 | −56.855 | | | | |

-continued f = 39.0–50.0—78.0
$F_{NO}$ = 4.1–5.3–8.2
2ω = 56.8–46.2–31.0°

| | 1st surface | 2nd surface | 8th surface |
|---|---|---|---|
| κ | 0.3691 | 0.2144 | 0.2991 |
| $C_4$ | $-0.3043 \times 10^{-3}$ | $-0.1649 \times 10^{-3}$ | $0.4087 \times 10^{-4}$ |
| $C_6$ | $-0.4079 \times 10^{-5}$ | $-0.3011 \times 10^{-5}$ | $0.4031 \times 10^{-6}$ |
| $C_8$ | $-0.9347 \times 10^{-8}$ | $0.2809 \times 10^{-7}$ | $-0.3068 \times 10^{-8}$ |
| $C_{10}$ | $-0.1064 \times 10^{-10}$ | $0.1755 \times 10^{-9}$ | $0.3344 \times 10^{-10}$ |

Values corresponding to the conditions in the present embodiment are as follows:

$|\phi_p+\phi_g|\cdot f_a=0.325$     (1)

$(rp_1-rp_2)/(rp_1+rp_2)=0.094$     (2)

$D_a/f_a=0.388$     (3)

$D_{23}/f_a=0.086$     (4)

$|D_b/f_b|=0.288$     (5)

$|(v_1\phi_1+v_2\phi_2)/(\phi_1+\phi_2)|=30.7$     (6)

$|(N_1\phi_1+N_2\phi_2)/(\phi_1+\phi_2)|=1.611$     (7)

[Embodiment 6]

f = 39.0–50.0—78.0
$F_{NO}$ = 4.1–5.3–8.2
2ω = 56.8–46.2–31.0°

| | r | d | n | v | |
|---|---|---|---|---|---|
| 1 | 1301.444 | 1.50 | 1.67270 | 32.2 | |
| 2 | 41.200 | 0.30 | | | |
| 3* | 20.740 | 3.10 | 1.58518 | 30.2 | (plastic) |
| 4* | 16.753 | 2.50 | | | |
| 5 | 56.506 | 3.40 | 1.51860 | 70.0 | |
| 6 | −11.147 | 2.20 | | | |
| 7 | 0.000 | 11.27–7.11–1.82 | | | (stop) |
| 8* | −35.824 | 3.00 | 1.58518 | 30.2 | (plastic) |
| 9 | −21.250 | 4.50 | | | |
| 10 | −10.894 | 1.50 | 1.71700 | 48.0 | |
| 11 | −46.601 | | | | |

| | 3rd surface | 4th surface | 8th surface |
|---|---|---|---|
| κ | 0.4034 | 0.2157 | 0.2991 |
| $C_4$ | $-0.2903 \times 10^{-3}$ | $-0.1521 \times 10^{-3}$ | $0.4787 \times 10^{-4}$ |
| $C_6$ | $-0.4319 \times 10^{-5}$ | $-0.3218 \times 10^{-5}$ | $0.1128 \times 10^{-6}$ |
| $C_8$ | $0.1737 \times 10^{-7}$ | $0.4413 \times 10^{-7}$ | $0.4851 \times 10^{-8}$ |
| $C_{10}$ | $-0.3966 \times 10^{-9}$ | $-0.904 \times 10^{-10}$ | $-0.2668 \times 10^{-10}$ |

Values corresponding to the conditions in the present embodiment are as follows:

$|\phi_p+\phi_g|\cdot f_a=0.296$     (1)

$(rp_1-rp_2)/(rp_1+rp_2)=0.107$     (2)

$D_a/f_a=0.401$     (3)

$D_{23}/f_a=0.093$     (4)

$|D_b/f_b|=0.328$     (5)

$|(v_1\phi_1+v_2\phi_2)/(\phi_1+\phi_2)|=31.7$     (6)

$|(N_1\phi_1+N_2\phi_2)/(\phi_1+\phi_2)|=1.698$     (7)

FIGS. 2A to 4D are aberration diagrams of Embodiment 1 of the present invention, FIGS. 6A to 8D are aberration diagrams of Embodiment 2 of the present invention, FIGS. 10A to 12D are aberration diagrams of Embodiment 3 of the present invention, FIGS. 14A to 16D are aberration diagrams of Embodiment 4 of the present invention, FIGS. 18A to 20D are aberration diagrams of Embodiment 5 of the present invention, and FIGS. 22A to 24D are aberration diagrams of Embodiment 6 of the present invention.

Here, FIGS. 2A to 2D, 6A to 6D, 10A to 10D, 14A to 14D, 18A to 18D, and 22A to 23D are aberration diagrams in a state of the shortest focal length at the wide-angle end; FIGS. 3A to 3D, 7A to 7D, 11A to 11D, 15A to 15D, 19A to 19D, and 23A to 23D are aberration diagrams in a state of an intermediate focal length; FIGS. 4A to 4D, 8A to 8D, 12A to 12D, 16A to 16D, 20A to 20D, and 24A to 24D are aberration diagrams in a state of the longest focal length at the telescopic end.

In each aberration diagram of astigmatism, the broken lines represent the meridional image surface and the solid lines represents the sagittal image surface.

It is seen from comparison between the aberration diagrams that the lens systems according to the present invention have excellent imaging performance from the wide-angle end to the telephoto end even though they are compact, relatively small in number of constituent lenses, and thin in lens thickness.

As described above, the present invention can realize lens systems for compact cameras, which are compact, relatively small in number of constituent lenses, and low in cost. Also, the present invention can employ any focusing method including the entire system feed-out, first unit feed-out, second unit feed-out, and floating methods. In addition, the anti-vibration effect can be achieved by decentering all of either the first lens unit or the second lens unit with respect to the optical axis or decentering a part of either the first lens unit or the second lens unit with respect to the optical axis.

What is claimed is:

1. A lens system having, in order from an object side, a first lens unit having a positive refractive power, a second lens unit having a negative refractive power, and a stop located between said first lens unit and said second lens unit, wherein a refractive power of the lens system is changed by changing an air gap between said first lens unit and said second lens unit;

wherein said first lens unit has, in order from the object side, a first lens component having a negative refractive power, a second lens component having a negative refractive power, and a third lens component having a positive refractive power;

wherein said second lens unit has, in order from the object side, a fourth lens component having a positive refractive power and a fifth lens component having a negative refractive power;

wherein one of said first lens component and said second lens component has a plastic lens and the other has a glass lens; and wherein the following conditions are satisfied:

$$0.29 < |\phi_p + \phi_g| \cdot f_a < 0.8 \quad \phi_p < 0, \phi_g < 0 \quad (1)$$

$$0 < (rp_1 - rp_2)/(rp_1 + rp_2) < 0.15 \quad (2)$$

$$0.3 < D_a/f_a < 0.45 \quad (3)$$

where $\phi_p$: a refractive power of said plastic lens;
$\phi_g$: a refractive power of said glass lens;
$f_a$: a focal length of said first lens unit;

$rp_1$: a paraxial radius of curvature of an object-side lens surface of said plastic lens;

$rp_2$: a paraxial radius of curvature of an image-side lens surface of said plastic lens;

$D_a$: a distance between a most object-side lens surface and a most image-side lens surface in said first lens unit.

2. A lens system according to claim 1, which satisfies the following conditions:

$$0.04 < D_{23}/f_a < 0.10 \quad (4)$$

$$0.2 < |D_b/f_b| < 0.4 \quad (5)$$

where $D_{23}$: an air gap between said second lens component and third lens component;

$D_b$: a distance between a most object-side surface and a most image-side surface in said second lens unit;

$f_b$: a focal length of said second lens unit.

3. A lens system according to claim 1, which satisfies the following conditions:

$$|(v_1\phi_1 + v_2\phi_2)/(\phi_1 + \phi_2)| < 35 \quad (6)$$

$$|(N_1\phi_1 + N_2\phi_2)/(\phi_1 + \phi_2)| > 1.60 \quad (7)$$

where $v_1$: an Abbe's number of said first lens component;
$\phi_1$: a refractive power of said first lens component;
$v_2$: an Abbe's number of said second lens component;
$\phi_2$: a refractive power of said second lens component;
$N_1$: an index of refraction with respect to d-line of said first lens component;
$N_2$: an index of refraction with respect to d-line of said second lens component.

4. A lens system according to claim 2, which satisfies the following conditions:

$$|(v_1\phi_1 + v_2\phi_2)/(\phi_1 + \phi_2)| < 35 \quad (6)$$

$$|(N_1\phi_1 + N_2\phi_2)/(\phi_1 + \phi_2)| > 1.60 \quad (7)$$

where $v_1$: an Abbe's number of said first lens component;
$\phi_1$: a refractive power of said first lens component;
$v_2$: an Abbe's number of said second lens component;
$\phi_2$: a refractive power of said second lens component;
$N_1$: an index of refraction with respect to d-line of said first lens component;
$N_2$: an index of refraction with respect to d-line of said second lens component.

5. A lens system having, in order from an object side, a first lens unit having a positive refractive power, and a second lens unit having a negative refractive power, wherein a refractive power of the lens system is changed by changing an air gap between said first lens unit and said second lens unit;

wherein said first lens unit consists of, in order from the object side, a first lens component having a negative refractive power, a second lens component having a negative refractive power, and a third lens component having a positive refractive power, said third lens component being a single spherical lens; and wherein said second lens unit comprises, in order from the object side, a fourth lens component having a positive refractive power and a fifth lens component having a negative refractive power.

6. A lens system according to claim 5, wherein one of said first lens component and second lens component has a plastic lens and the other has a glass lens.

7. A lens system according to claim 6, which satisfies the following conditions:

$$0.29 < |\phi_p + \phi_g| \cdot f_a < 0.8 \quad \phi_p < 0, \phi_g < 0 \tag{1}$$

$$0 < (rp_1 - rp_2)/(rp_1 + rp_2) - 0.15 \tag{2}$$

$$0.3 < D_a/f_a < 0.45 \tag{3}$$

where $\phi_p$: a refractive power of said plastic lens;

$\phi_g$: a refractive power of said glass lens;

$f_a$: a focal length of said first lens unit;

$rp_1$: a paraxial radius of curvature of an object-side lens surface of said plastic lens;

$rp_2$: a paraxial radius of curvature of an image-side lens surface of said plastic lens;

$D_a$: a thickness between a most object-side lens surface and a most image-side lens surface in said first lens unit.

8. A lens system according to claim 5, further comprising a stop located between said first lens unit and said second lens unit.

9. A lens system according to claim 5, wherein the following condition is satisfied:

$$|(N_1\phi_1 + N_2\phi_2)/(\phi_1 + \phi_2)| > 1.60 \tag{7}$$

where $N_1$: an index of refraction with respect to d-line of said first lens component;

$N_2$: an index of refraction with respect to d-line of said second lens component;

$\phi_1$: a refractive power of said first lens component; and $\phi_2$: a refractive power of said second lens component.

10. A lens system according to claim 5, wherein said first lens component is a negative meniscus lens with a concave surface facing an image side.

11. A lens system having, in order from an object side, a first lens unit having a positive refractive power, and a second lens unit having a negative refractive power, wherein a refractive power of the lens system is changed by changing an air gap between said first lens unit and said second lens unit;

wherein said first lens unit consists of, in order from the object side, a first lens component having a negative refractive power, a second lens component having a negative refractive power, and a third lens component having a positive refractive power;

wherein said second lens unit comprises, in order from the object side, a fourth lens component having a positive refractive power and a fifth lens component having a negative refractive power, and wherein one of said first lens component and second lens component is constructed of a plastic lens and the other is constructed of a glass lens, and said third lens component is constructed of a glass lens.

12. A lens system according to claim 11, wherein the following condition is satisfied:

$$0.04 < D_{23}/f_a < 0.10 \tag{4}$$

where $D_{23}$: an air gap between said second lens component and third lens component; and $f_a$: a focal length of said first lens unit.

13. A lens system according to claim 12, wherein the following condition is satisfied:

$$|(N_1\phi_1 + N_2\phi_2)/(\phi_1 + \phi_2)| > 1.60 \tag{7}$$

where $N_1$: an index of refraction with respect to d-line of said first lens component;

$N_2$: an index of refraction with respect to d-line of said second lens component;

$\phi_1$: a refractive power of said first lens component; and $\phi_2$: a refractive power of said second lens component.

14. A lens system according to claim 11, wherein said first lens component is a negative meniscus lens with a concave surface facing an image side.

* * * * *